(12) United States Patent  (10) Patent No.: US 7,846,029 B2
Higashitani et al.  (45) Date of Patent: Dec. 7, 2010

(54) TORQUE LIMITER

(75) Inventors: Takuya Higashitani, Nagano (JP); Hideaki Ito, Nagano (JP); Kazunori Nishikawa, Nagano (JP)

(73) Assignee: Nidec Sankyo Corporation (JP)

( * ) Notice: Subject to any disclaimer, the term of this patent is extended or adjusted under 35 U.S.C. 154(b) by 435 days.

(21) Appl. No.: 11/847,766

(22) Filed: Aug. 30, 2007

(65) Prior Publication Data

US 2008/0053779 A1 Mar. 6, 2008

(30) Foreign Application Priority Data

Aug. 31, 2006 (JP) ............................. 2006-236925

(51) Int. Cl.
*F16D 7/02* (2006.01)
(52) U.S. Cl. .......................................... 464/41; 74/461
(58) Field of Classification Search .................. 464/30, 464/34, 40, 41, 78; 74/461; 62/340
See application file for complete search history.

(56) References Cited

U.S. PATENT DOCUMENTS 3,443,375 A * 5/1969 Cielaszyk ................. 464/41 X
2005/0239556 A1* 10/2005 Huthmacher et al. .......... 464/41

* cited by examiner

*Primary Examiner*—Greg Binda
(74) *Attorney, Agent, or Firm*—Cantor Colburn LLP

(57) ABSTRACT

A torque limiter may include a first member provided with a circumferential face, a second member provided with a base plate part and a cylindrical drum part which is extended from the base plate part so as to surround the circumferential face of the first member, and an urging member for urging the cylindrical drum part of the second member to the circumferential face of the first member. The cylindrical drum part is formed with a plurality of cutout parts to be divided into a plurality of elastic plate parts. The cutout part is extended from a tip end of the cylindrical drum part to a middle position in a radial direction of the base plate part and the elastic plate part is formed of the cylindrical drum part and the base plate part.

9 Claims, 13 Drawing Sheets

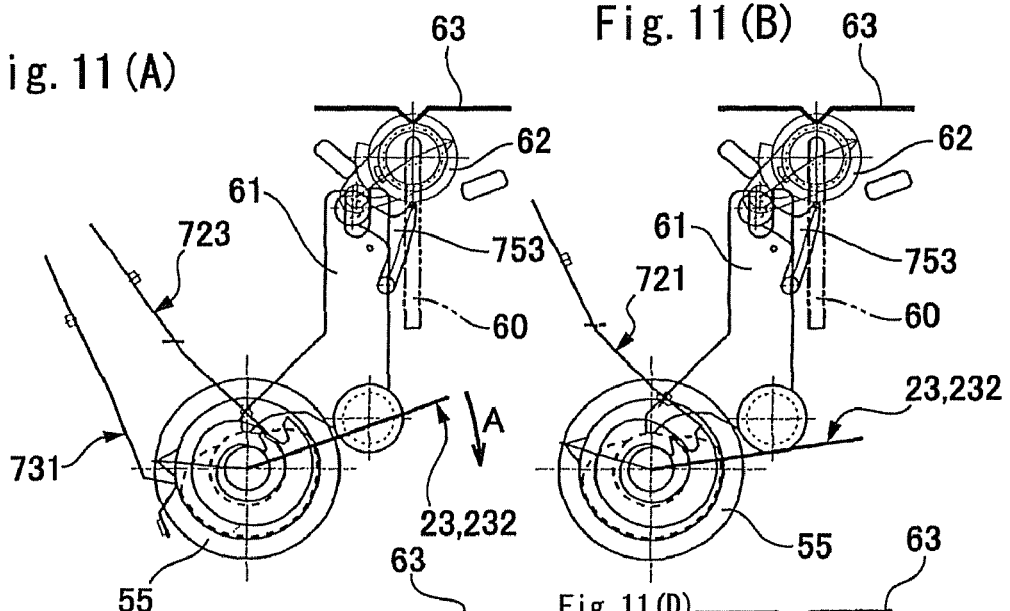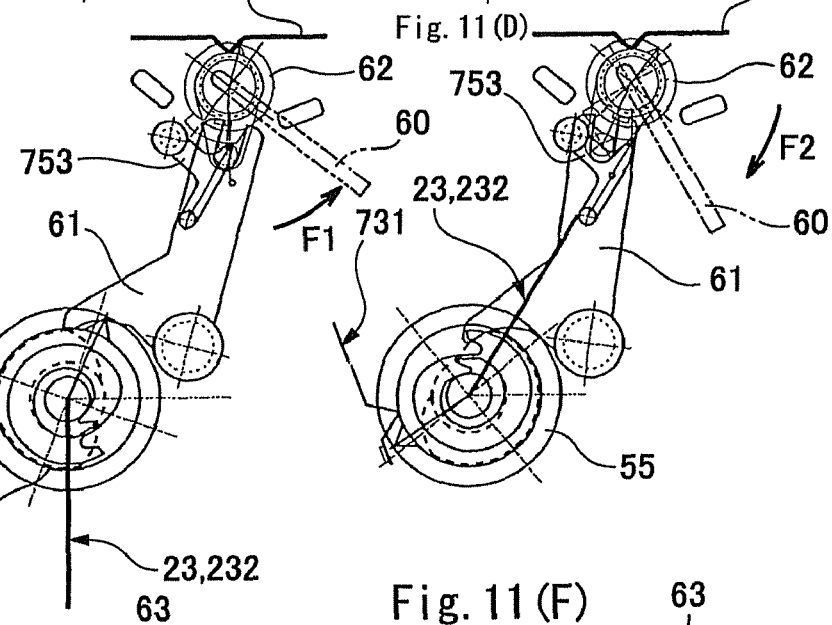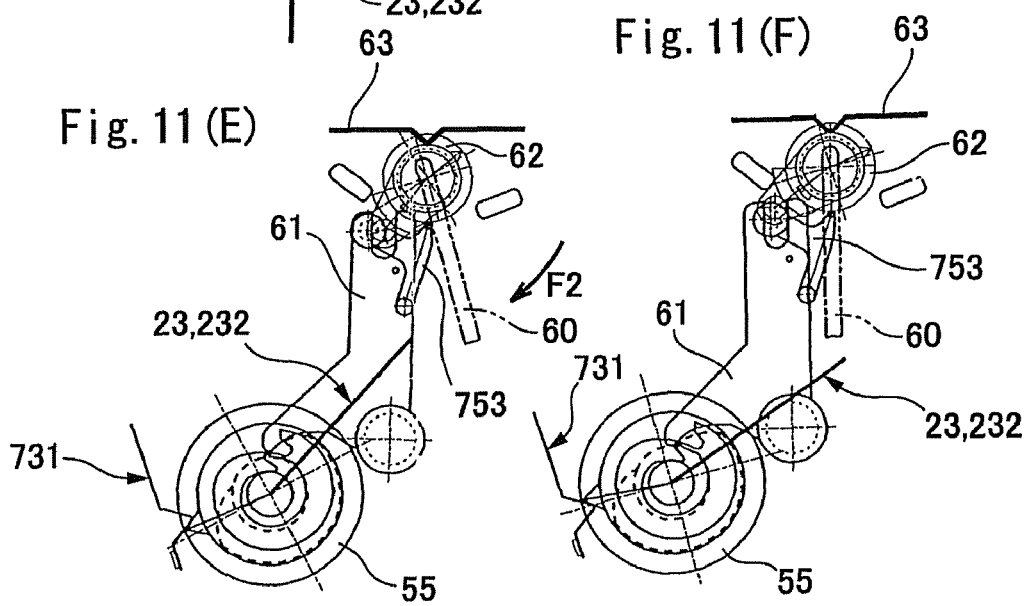

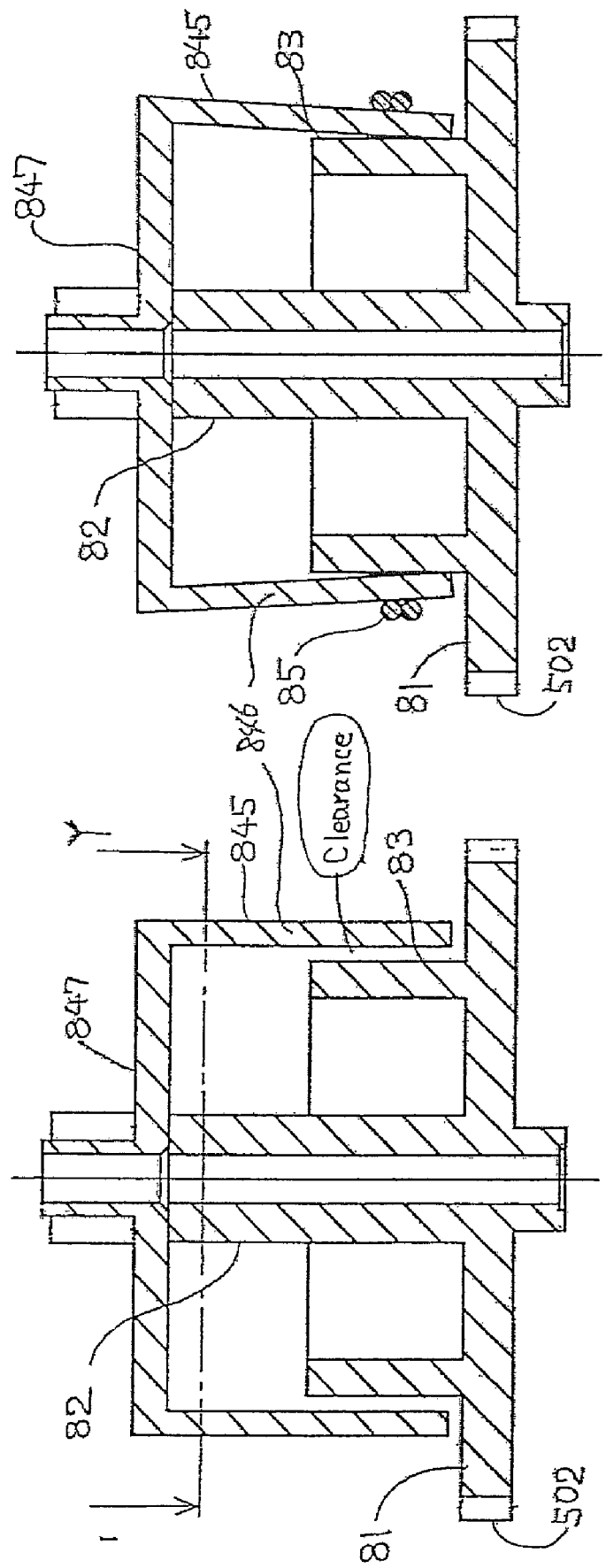

TORQUE LIMITER

CROSS REFERENCE TO RELATED APPLICATION

The present invention claims priority under 35 U.S.C. §119 to Japanese Application No. 2006-236925 filed Aug. 31, 2006, which is incorporated herein by reference.

FIELD OF THE INVENTION

An embodiment of the present invention may relate to a torque limiter which is capable of changing states between a first state where a first member and a second member are rotated in an integral manner and a second state where the first member and the second member are slipped on each other.

BACKGROUND OF THE INVENTION

In various devices, a torque limiter is often used in which rotation between two members is transmitted to each other and slipping occurs between the two members when some load is applied to one of the members. As an example of the torque limiter, it is conceivable that a torque limiter includes a first member provided with a circumferential face, a second member which faces the first member and an urging member which urges the second member to the first member. The second member is provided with a base plate part and a cylindrical drum part which is extended from a tip end periphery of the base plate part so as to surround the circumferential face of the first member. Further, it is conceivable that the cylindrical drum part is formed with a plurality of cutout parts and thus the second member is provided with the cylindrical drum part which is divided into a plurality of elastic plate parts. The urging member urges the plurality of elastic plate parts of the second member to the circumferential face of the first member. In this manner, the torque limiter is capable of changing states between an integrally rotating state of the first member and the second member and a slipping state where slipping occurs between the circumferential face of the first member and the elastic plate parts of the second member by utilizing elasticity of the elastic plate part and the urging force of the urging member.

However, in the torque limiter described above, it is difficult to obtain a stable friction torque due to dimensional dispersion of the first member and the second member and dispersion of rigidity of the elastic plate part. Further, when rigidity of the elastic plate part varies with time or due to variation of ambient temperature, the variation also causes the friction torque to vary.

SUMMARY OF THE INVENTION

In view of the problems described above, an embodiment of the present invention may advantageously provide a torque limiter in which variation of its friction torque due to dimensional accuracy of the first member and the second member or rigidity variation of an elastic plate part is reduced.

Thus, according to an embodiment of the present invention, there may be provided a torque limiter including a first member which is provided with a circumferential face, a second member which faces the first member and an urging member which urges the second member to the first member. The second member includes a base plate part and a cylindrical drum part which is extended from the base plate part so as to surround the circumferential face of the first member, and an urging member is structured so as to urge the cylindrical drum part of the second member to the circumferential face of the first member. In addition, the cylindrical drum part is formed with a plurality of cutout parts in an axial direction and thus the second member is provided with the cylindrical drum part which is divided into a plurality of elastic plate parts, and the cutout part is extended from a tip end of the cylindrical drum part to a middle position in a radial direction of the base plate part and the elastic plate part is formed of the cylindrical drum part and the base plate part.

In accordance with an embodiment of the present invention, both of the base plate part and the cylindrical drum part of the second member are divided by the cutout parts to form a plurality of the elastic plate parts. Therefore, the elastic plate part has a high rigidity in the circumferential direction but its rigidity in the radial direction is low because the length of the elastic plate part can be formed long. Accordingly, the rigidity of the elastic plate part does not have a large influence on its friction torque and the friction torque can be substantially determined only by the urging force of the urging member. Therefore, even when dimensions of the first member and the second member are varied or, when the rigidity of the elastic plate part is varied with time or due to variation of ambient temperature, a stable friction torque can be obtained.

Specifically, the first member may be a gear body including a large diameter circular plate part which is formed with a gear, and a cylindrical part which is provided with the circumferential face and which is formed on the large diameter circular plate part. The second member is a cup-shaped sliding member in which the plurality of elastic plate parts is formed of the cylindrical drum part and the base plate part by forming the cutout part.

In accordance with an embodiment, the urging member is a ring-shaped urging member which is mounted around the plurality of elastic plate parts. According to the urging member described above, since an urging force is stable in comparison with a flat spring or a coned disk spring, a stable friction torque can be obtained. Specifically, the urging member is a coil spring which urges to cause the plurality of elastic plate parts of the cylindrical drum part to abut with the cylindrical part of the gear body by the coil spring.

In accordance with an embodiment, a clearance is provided between the circumferential face of the first member and the elastic plate part of the second member in a state that the ring-shaped urging member is detached from the cylindrical drum part. According to the structure as described above, even when the dimensions of the first member and the second member are varied, a stable friction torque can be obtained.

In accordance with an embodiment, the ring-shaped urging member is mounted on a tip end side of the elastic plate part. According to the structure as described above, since the elastic plate part can be easily deformed, a spring with a small spring constant is used as the urging member to deform the urging member largely. Therefore, even when the dimensions of the first member and the second member are varied, a stable friction torque can be obtained. Further, in order to deform the elastic plate part easily, it is preferable that the cutout part which is formed from the cylindrical drum part to the middle position in the radial direction of the base plate part is formed such that a length of the cutout part formed in the cylindrical drum part is longer than a length of the cutout part formed in the base plate part.

In accordance with an embodiment, the cylindrical drum part is perpendicularly extended from the base plate part. According to the structure as described above, since the elastic plate part can be easily deformed, a spring with a small spring constant can be used as the urging member to cause the urging member to deform largely. Therefore, even when the dimensions of the first member and the second member are varied, a stable friction torque can be obtained.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 11(A) through 11(F) are explanatory views showing operations of the drive unit structured in the ice making device shown in FIG. 1.

FIGS. 13(A) and 13(B) show a cross-sectional view of an assembled torque limiter in accordance with an embodiment.

DETAILED DESCRIPTION OF THE PREFERRED EMBODIMENTS

An ice making device to which the present invention is applied will be described below with reference to the accompanying drawings.

Figure 1:
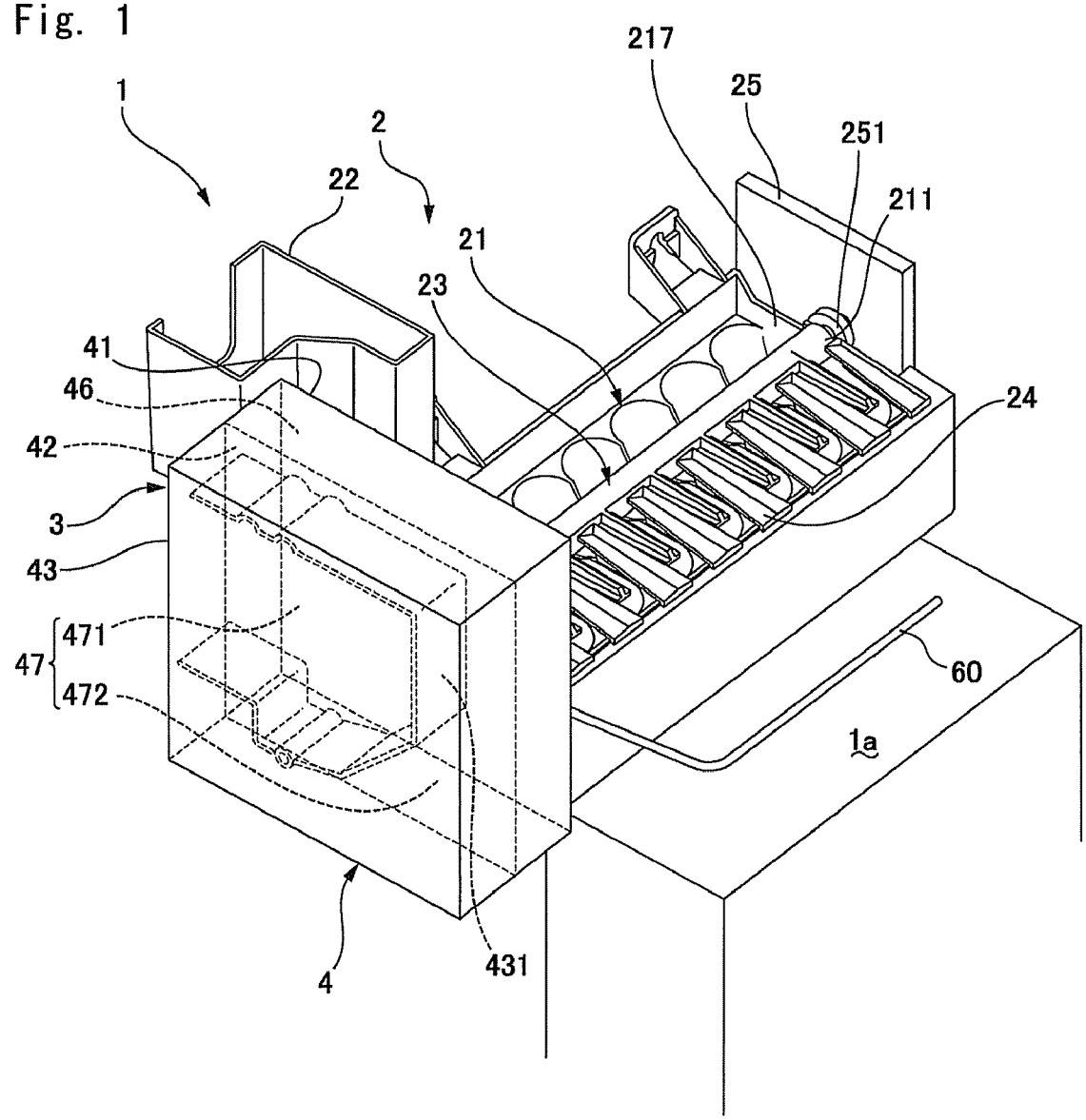
FIG. 1 is a perspective view showing an ice making device in accordance with an embodiment of the present invention.

FIG. 1 is a perspective view showing an ice making device in accordance with an embodiment of the present invention.

Figure 2A:
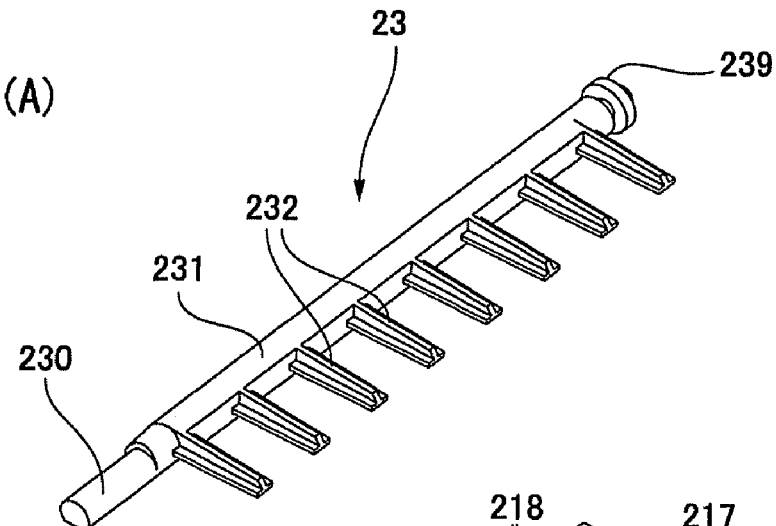
FIG. 2(A) is a perspective view showing a raking member.
Figure 2B:
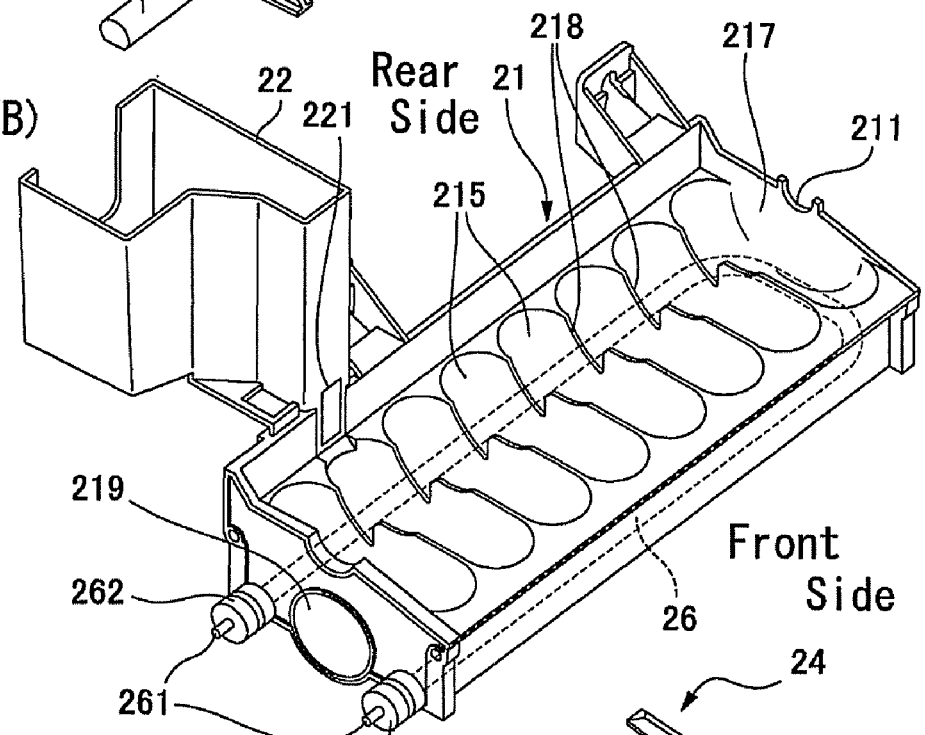
FIG. 2(B) is a perspective view showing an ice tray.
Figure 2C:
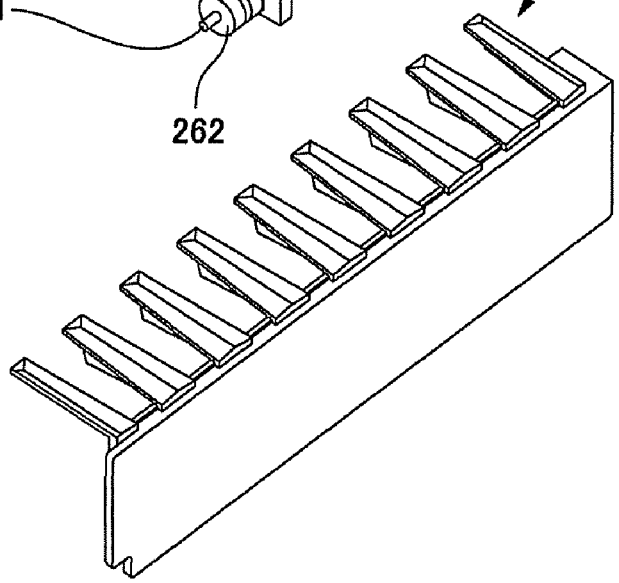
FIG. 2(C) is a perspective view showing a guide member, which are used in the ice making device shown in FIG. 1.
Figure 3A:
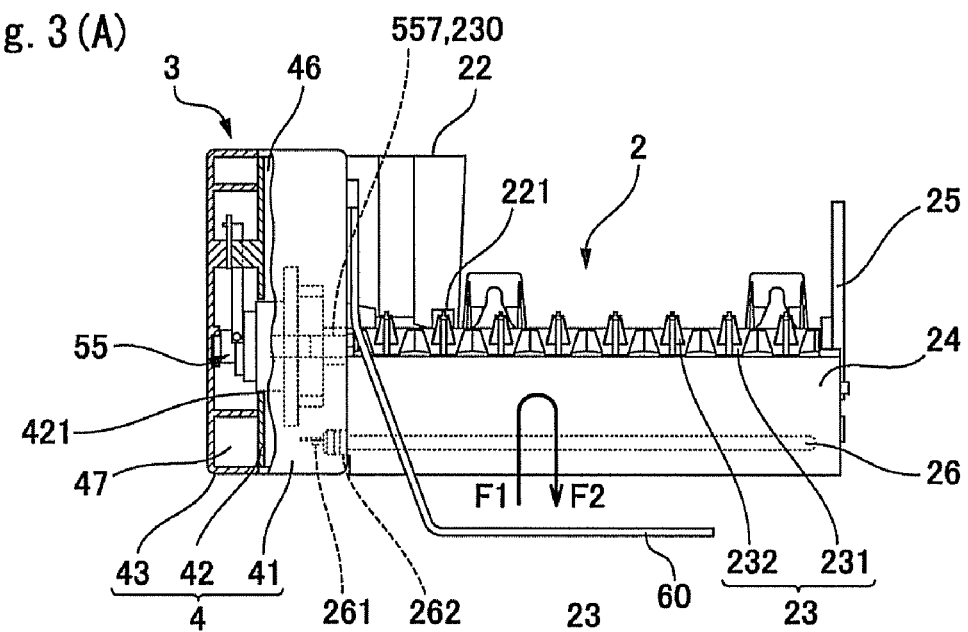
FIG. 3(A) is a front view showing the ice making device shown in FIG. 1.
Figure 3B:
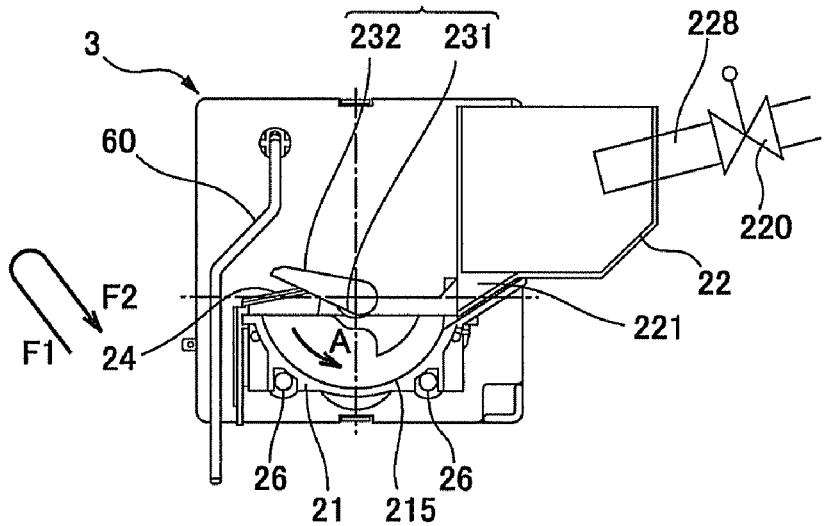
FIG. 3(B) is a cross-sectional view showing a state where the raking member in the ice making device is located at a home position.
Figure 3C:
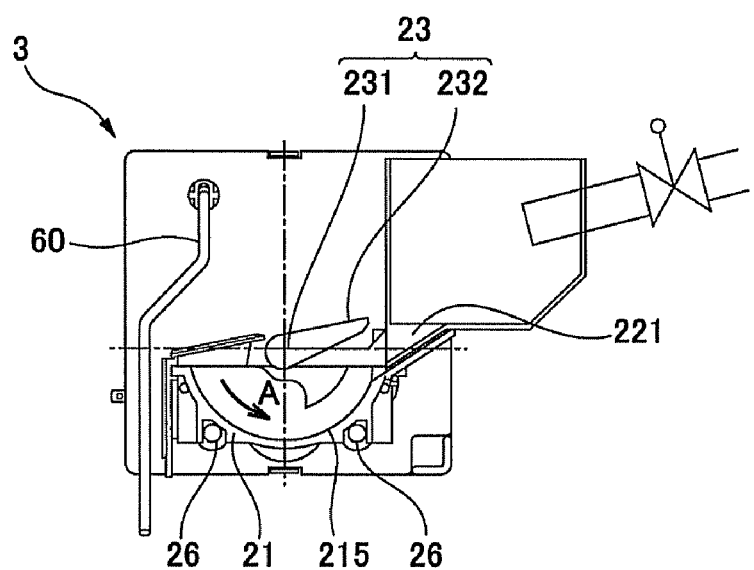
FIG. 3(C) is a cross-sectional view showing a state where the raking member has turned from the home position.

FIG. 2(A) is a perspective view showing a raking member, FIG. 2(B) is a perspective view showing an ice tray, and FIG. 2(C) is a perspective view showing a guide member, which are used in the ice making device shown in FIG. 1. FIG. 3(A) is a front view showing the ice making device shown in FIG. 1, FIG. 3(B) is a cross-sectional view showing a state where the raking member in the ice making device is located at a home position, and FIG. 3(C) is a cross-sectional view showing a state where the raking member has turned from the home position.

In FIG. 1, FIGS. 2(A) through 2(C) and FIGS. 3(A) through 3(C), an ice making device 1 in accordance with an embodiment is a device in which ice pieces are successively manufactured within a refrigerator or a freezer and manufactured ice pieces are automatically discharged to an ice storage part 1a which is disposed on a lower side. The ice making device 1 includes an ice making unit 2 for manufacturing ice pieces and a drive unit 3 (drive control part) for controlling a raking operation and the like of the ice pieces. An ice detecting lever 60 formed in a roughly L-shape is extended toward the lower ice storage part 1a from the drive unit 3. The ice making unit 2 includes an ice tray 21, a water-supply part 22 disposed on a side (rear side) of the ice tray 21 for supplying the ice tray 21 with water, a raking member 23 for raking out the ice pieces manufactured in the ice tray 21, a guide member 24 for guiding the ice pieces which has been raked out by the raking member 23 to the ice storage part 1a located downward of the ice tray 21, and an end plate 25 structuring a right side face of the ice tray 21.

The ice tray 21 is made of aluminum on which surface treatment such as coating or alumite treatment is performed. A plurality of ice making grooves 215 (recessed part for ice making) is dividedly formed on an upper face of the ice tray 21 by partition plates 218. Water supplied from the water-supply part 22 is respectively stored in the plurality of ice making grooves 215 to be frozen up. A heater 26 for heating a bottom face of the ice tray 21 when the ice pieces are to be discharged from the ice tray 21 is disposed on a bottom face of the ice tray 21. The heater 26 is integrated with the ice tray 21 by caulking or the like. Two terminal parts 262 made of rubber for the heater 26 are protruded from a left side face part of the ice tray 21 and a terminal 261 is protruded from a tip end face of the respective two terminal parts 262. A temperature detecting part 219 is formed in an area between the two terminal parts 262 of the ice tray 21 and a thermostat is abutted with the temperature detecting part 219 to monitor temperature of the ice tray 21.

The water-supply part 22 is disposed on an opposite side (rear side) to the side where the ice pieces are discharged (front side) with respect to the ice tray 21 and is provided with a water-supply port 221 which opens in a rear wall of the ice tray 21. Water is supplied from a hose 228 to the water-supply part 22 and a water-supply valve 220 is provided at a midway position of the hose as schematically shown in FIG. 3(B).

The raking member 23 is provided with a rotation shaft 231 which is laterally extended at an upper position of the ice tray 21 and a plurality of raking parts 232 which are protruded from the rotation shaft 231 in a claw-like shape in the same direction. The respective raking parts 232 are provided so as to correspond to the respective ice making grooves 215. A right side end part of the rotation shaft 231 is rotatably supported by a cutout part 211 which is formed at an edge part of a right side face part 217 of the ice tray 21 and is rotatably supported by a shaft hole 251 formed in the end plate 25. Further, a flange part 239 formed at the right side end part of the rotation shaft 231 is abutted with an inner side face of the end plate 25 and thus movement of the rotation shaft 231 toward the right side is restricted. On the other hand, the other end of the rotation shaft 231 is formed in a D-cut (D-shaped) portion 230 and, as shown in FIG. 3(A), the D-cut portion 230 is connected with a rotary cam body 55 (cam body) disposed within the drive unit 3.

In accordance with an embodiment, a position of the raking part 232 shown in FIG. 3(B) is set to be a home position. In the home position, the raking parts 232 are set in a state that the raking parts 232 are inclined on an opposite side to the water-supply port 221 with respect to the rotation shaft 231. From this state, the rotation shaft 231 is turned in a direction shown by the arrow "A" to reach to a position shown in FIG. 3(C). During this movement, the raking parts 232 cause ice pieces in the ice making grooves 215 to move up from the ice tray 21. The ice pieces moved up from the ice tray 21 by the raking parts 232 slide on the raking parts 232 and an upper face of the guide member 24 to fall to the ice storage part 1a from a front side of the ice tray 21. In this case, the ice pieces moved up from the ice tray 21 may not fall to the ice storage part 1a by only the raking parts 232 which have reached to the state shown in FIG. 3(C) from the state shown in FIG. 3(B). However, the ice pieces in the ice tray 21 has completely fallen to the ice storage part 1a before the raking parts 232 are returned to the home position shown in FIG. 3(B).

FIGS. 4(A) through 4(D) and FIGS. 5(A) through 5(D) are explanatory circuit diagrams showing a schematic electrical structure of a drive unit of the ice making device shown in FIG. 1. FIG. 6 is a timing chart showing an operation of the ice making device shown in FIG. 1.

Figure 4A:
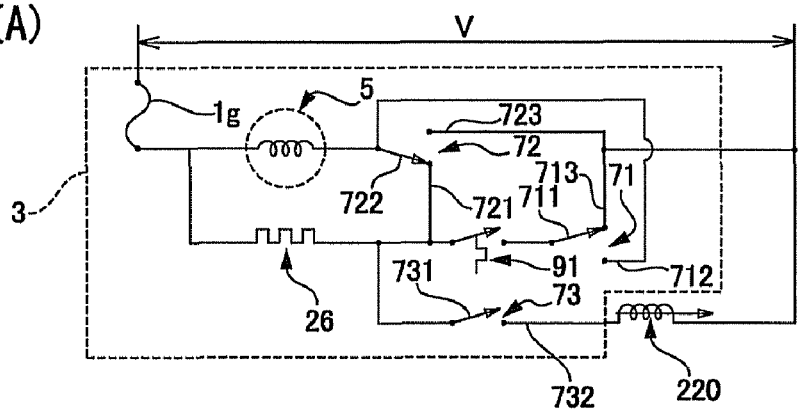
FIGS. 4(A) through 4(D) are explanatory circuit diagrams showing a schematic electrical structure of a drive unit of the ice making device shown in FIG. 1.

A mechanical structure of a drive unit 3 of the ice making device 1 in accordance with an embodiment will be described in detail below with reference to FIG. 7, FIG. 8(A) and the like. The drive unit 3 of the ice making device 1 in this embodiment includes, as shown in FIG. 4(A), a thermostat 91 for monitoring temperature of the ice tray 21, a motor 5 for driving the rotation shaft 231, a main switch 72 for performing open/close operation in conjunction with rotational operation of a rotary cam body 55 shown in FIG. 3(A), a water-supply switch 73 for controlling the water-supply valve 220 in conjunction with the rotational operation of the rotary cam body 55, an ice detecting switch 71 for monitoring whether the ice storage part 1a is in a shortage state or in a full state of ice pieces, and a fuse 1g. Further, the ice making device 1 is provided with a transmission mechanism for transmitting a rotary output of the motor 5 to the rotary cam body 55, a torque limiter disposed at a midway position of the transmission mechanism and the like as described below.

Next, a basic operation of the ice making device 1 will be described below based on the chart shown in FIG. 6. First, after water has been supplied to the ice tray 21 from the water-supply port 221, an ice making operation is started in the ice tray 21. During this time, power supply to the motor 5 and the heater 26 is stopped and the raking parts 232 are stopped at the home position where the raking parts 232 are inclined on an opposite side to the water-supply port 221 as shown in FIG. 3(B). In this state, as shown in FIG. 4(A), the main switch 72 is in a first state where the thermostat 91 and the water-supply switch 73 are in an "OFF" state. In addition, the ice detecting switch 71 is located at a position showing an ice shortage state (first state).

Figure 4B:
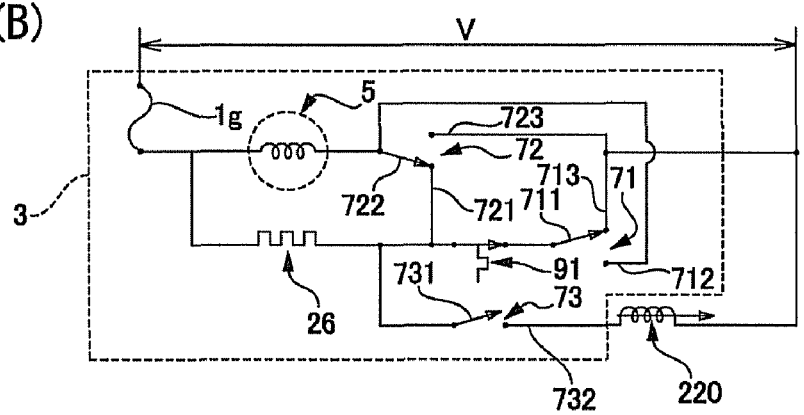

After that, at the time of "T0", when a monitoring result of the thermostat 91 for the ice tray 21 indicates that a temperature of the ice tray 21 has become equal to a predetermined temperature or lower, as shown in FIG. 4(B), the thermostat 91 is turned to be in an "ON" state and energization to the motor 5 and the heater 26 is started. As a result, the rotary cam body 55 is turned and thus the raking member 23 is started to turn in a direction shown by the arrow "A" in FIG. 3(B) and the heater 26 starts to warm the ice tray 21.

Figure 4C:
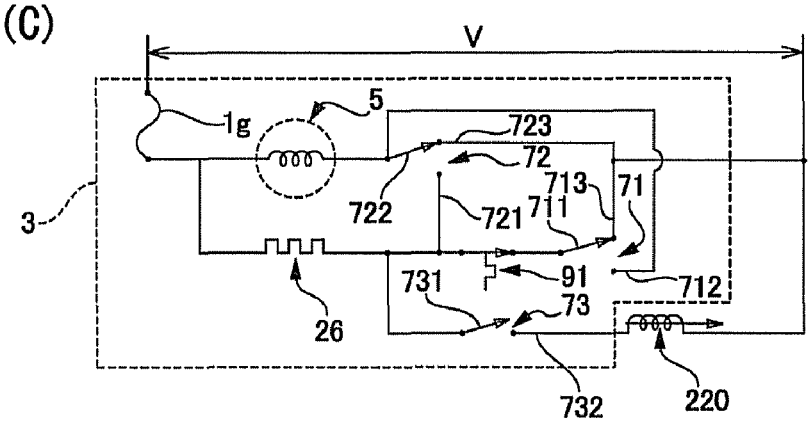

Next, at the time of "T1", the main switch 72 is switched to a second state as shown in FIG. 4(C). However, even when the main switch 72 is switched to the second state, the energization to the motor 5 and the heater 26 is continued. Therefore, the raking member 23 is driven by the motor 5 and tip end portions of the raking parts 232 are abutted with upper faces of ice pieces manufactured in the ice tray 21. However, at this time, the temperature of the ice tray 21 may be low and thus an ice adhering force of the ice piece in the ice tray 21 is large. Therefore, turning of the raking member 23 is prevented by the ice pieces in the ice tray 21 and the tip end portions of the raking parts 232 are stopped in a state where that the tip end portions of the raking parts 232 are abutted with the upper faces of the ice pieces in the ice tray 21. In accordance with an embodiment, a torque limiter is disposed at a midway position of a power transmission route from the motor 5 to the raking member 23. Therefore, the motor 5 is capable of continuing to rotate while turning of the raking member 23 is stopped, and thus a torque limited by the torque limiter 8 continues to act on the ice pieces.

Figure 4D:
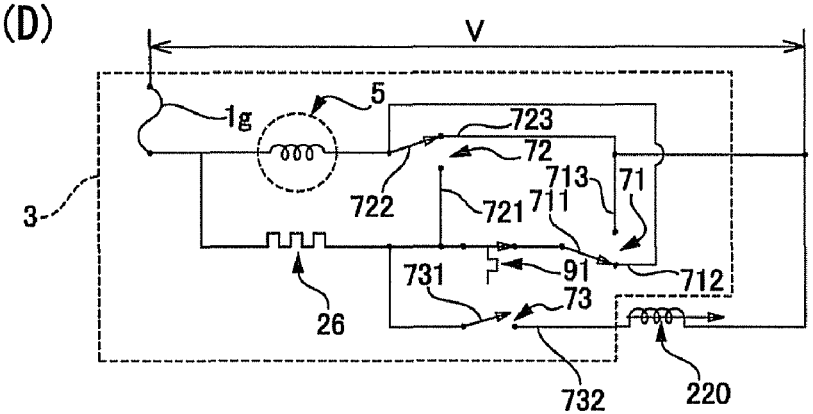

When the ice pieces have been separated from the ice tray 21 by applying heat with the heater 26, the raking member 23 connected with the rotary cam body 55 starts to turn in a direction where the ice pieces are raked out and then an ice detecting operation is performed. At the time of "T2", a tip end portion of the ice detecting lever 60 firstly moves upward from the ice storage part 1a. As a result, as shown in FIG. 4(D), the ice detecting switch 71 is temporarily switched from the first state to the second state. At approximately same time, discharge of the ice pieces is started and, after all of the ice pieces have fallen into the ice storage part 1a, at a time of "T3", the tip end portion of the ice detecting lever 60 moves down toward the ice storage part 1a again. At this time, when the ice storage part 1a is in an ice shortage state, the tip end portion of the ice detecting lever 60 is capable of being moved downward and thus, as shown in FIG. 4(C), the ice detecting switch 71 is returned to the first state from the second state.

Figure 5A:
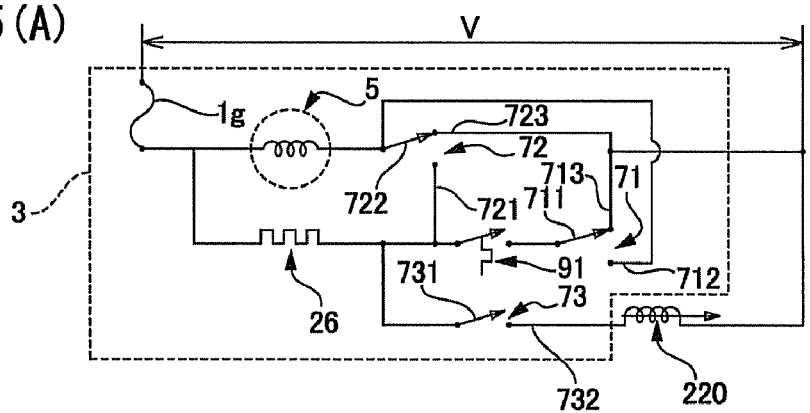
FIGS. 5(A) through 5(D) are explanatory circuit diagrams showing the schematic electrical structure of the drive unit of the ice making device shown in FIG. 1.
Figure 6:
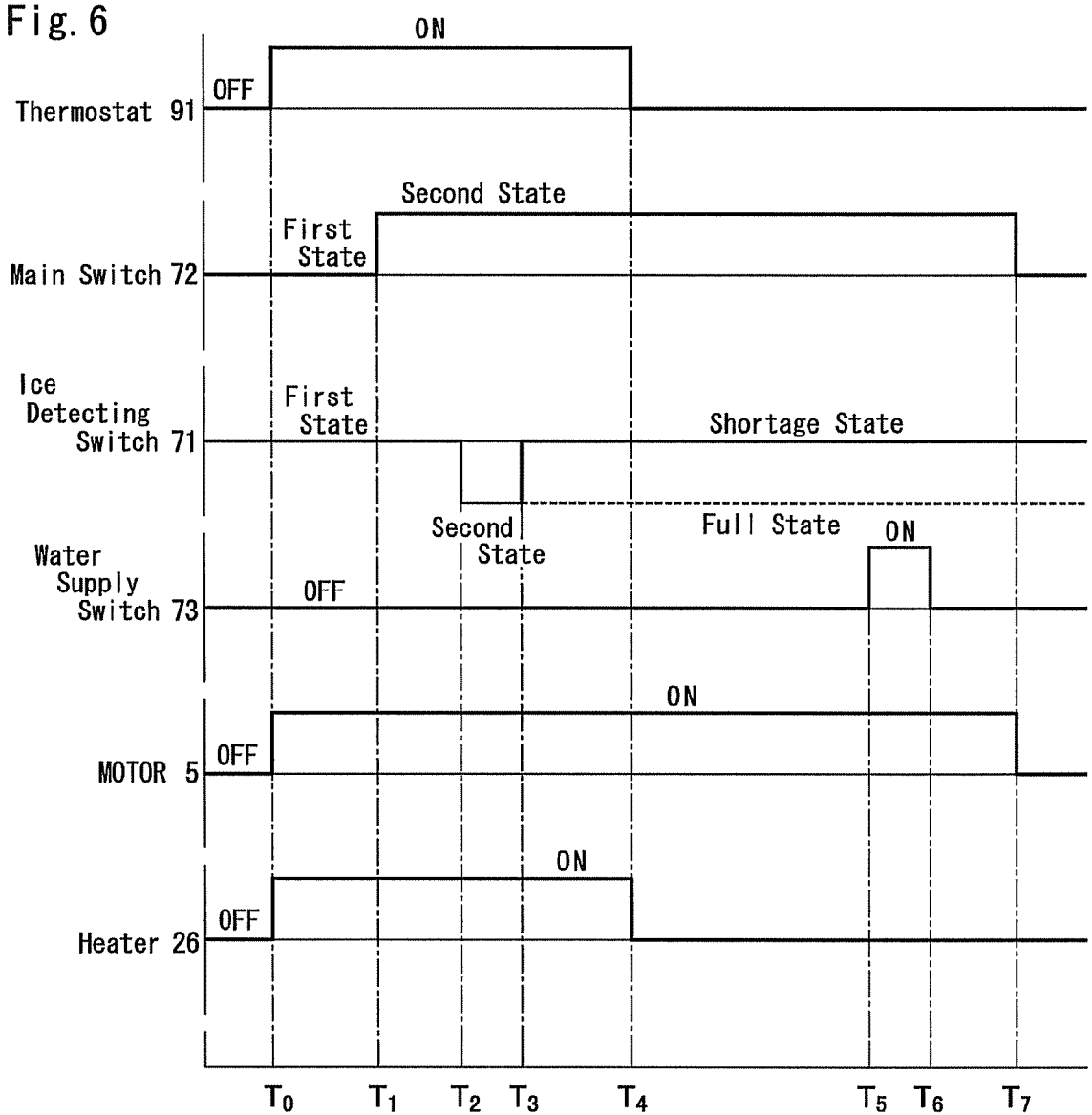
FIG. 6 is a timing chart showing an operation of the ice making device shown in FIG. 1.

Next, at the time of "T4", when a temperature of the ice tray 21 exceeds a predetermined temperature, a monitoring result of the thermostat 91 for the ice tray 21 is, as shown in FIG. 5(A), changed to an "OFF" state and energization to the heater 26 is stopped. However, energization to the motor 5 is continued.

Figure 5B:
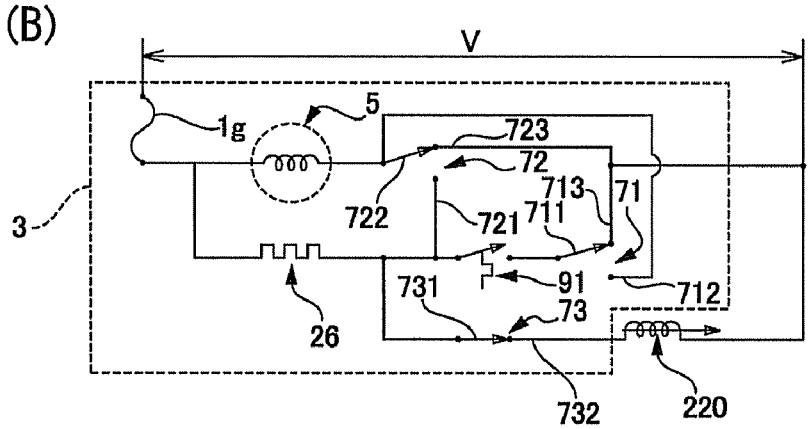

Next, at the time of "T5", as shown in FIG. 5(B), when the water-supply switch 73 is changed to an "ON" state, the water-supply valve 220 is changed to an open state to supply water to the ice tray 21 through the water-supply port 221. In this case, since a resistance value of the heater 26 is small, the heater 26 is utilized as a part of electric wiring when the water-supply valve 220 is energized. At this time, the raking parts 232 have already passed near the water-supply port 221 and are located on a side in an inclined state which is opposite to the side where the water-supply port 221 is disposed.

Figure 5C:
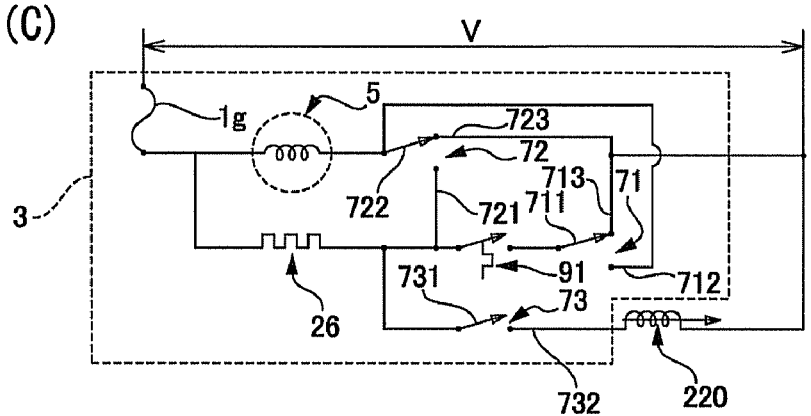

Next, at the time of "T6", as shown in FIG. 5(C), since the water-supply switch 73 is changed to an "OFF" state, the water-supply valve 220 is changed to a closed state and water-supply to the ice tray 21 through the water-supply port 221 is stopped. Next, at the time of "T7", power supply to the motor 5 is stopped and the raking parts 232 are stopped at the home position where the raking parts 232 are inclined on the opposite side to the water-supply port 221. In the meantime, the main switch 72 is returned to the first state as shown in FIG. 4(A). Further, ice making is performed in the ice tray 21 again and then the above-mentioned operation is repeated.

Figure 5D:
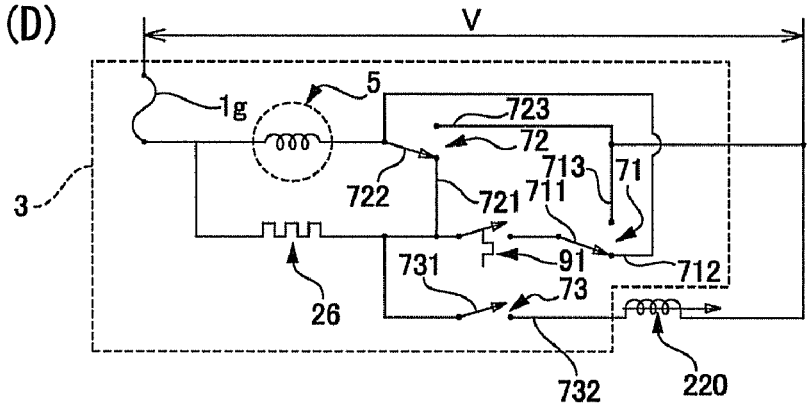

In the embodiment described above, after the tip end portion of the ice detecting lever 60 has been moved upward from the ice storage part 1a at the time of "T2" and then, its tip end portion is going to move downward to the ice storage part 1a again at the time of "T3". In this case, when the ice storage part 1a is in an ice full state, the tip end portion of the ice detecting lever 60 cannot move downward and thus the ice detecting switch 71 remains to be in the second state as shown in FIG. 4(D). However, also in this state, energization to the heater 26 and the motor 5 is continued and thus operation for returning to the home position is performed. In subsequent operations, when the ice storage part 1a is in the ice full state, as shown in FIG. 5(D), the ice detecting switch 71 remains to be in the second state. Therefore, even when a temperature of the ice tray 21 becomes equal to a predetermined temperature or lower to cause the thermostat 91 to be changed to an "ON" state, energization to the heater 26 and the motor 6 is not performed. Accordingly, after quantity of ice pieces in the ice storage part 1a has been reduced and the ice detecting switch 71 is changed to the first state from the second state, energization to the heater 26 and the motor 6 is started.

As described above, in the ice making device 1 in accordance with this embodiment, ice pieces can be successively manufactured and manufactured ice pieces can be automatically discharged to the ice storage part 1a which is disposed downward. Further, ice quantity is detected in the ice storage part 1a and, when the ice storage part 1a is in an ice full state, discharging of ice pieces to the ice storage part 1a is not performed and thus the ice pieces do not overflow from the ice storage part 1a.

Further, in this embodiment, when the raking parts 232 are passed through near the water-supply port 221 and, in addition, passed through just above the rotation shaft 31 and then reached to a position where the raking parts 232 are inclined on an opposite side to the water-supply port 221, the drive unit 3 starts to supply water from the water-supply port 221 to the ice tray 21. Therefore, a state is avoided where water is splashed on the raking parts 232 at the time of water-supply to cause the water to be frozen and, as a result, the ice tray 21 and the raking parts 232 are prevented to be frozen with each other.

Further, since the home position of the raking parts 232 is set on an opposite side to the side where the water-supply port 221 is arranged with respect to the rotation shaft 231, the water-supply part 22 is not disposed near the raking parts 232 which are stopped at the home position. Therefore, when confirmation of an operation of the raking member 23 is performed by manually pressing the raking parts 232 from an upper side to turn it in the direction shown by the arrow "A", the operation is not disturbed by the water-supply part 22 and thus the operation can be easily confirmed.

Further, since the home position of the raking parts 232 is set on the opposite side to the side where the water-supply port 221 is arranged with respect to the rotation shaft 231, when the raking parts 232 are depressed, the raking member 23 is turned so as to rake out in the direction shown by the arrow "A" and thus the operation can be easily confirmed. In other words, as a comparison example, when the home position of the raking parts 232 are set, for example, at a position shown in FIG. 3(C), in order to turn the raking member 23 in the direction as shown by the arrow "A", it is required that a finger is inserted between the raking parts 232 to turn it up. However, according to the embodiment of the present invention, the troublesome operation as described above is not required.

Figure 7:
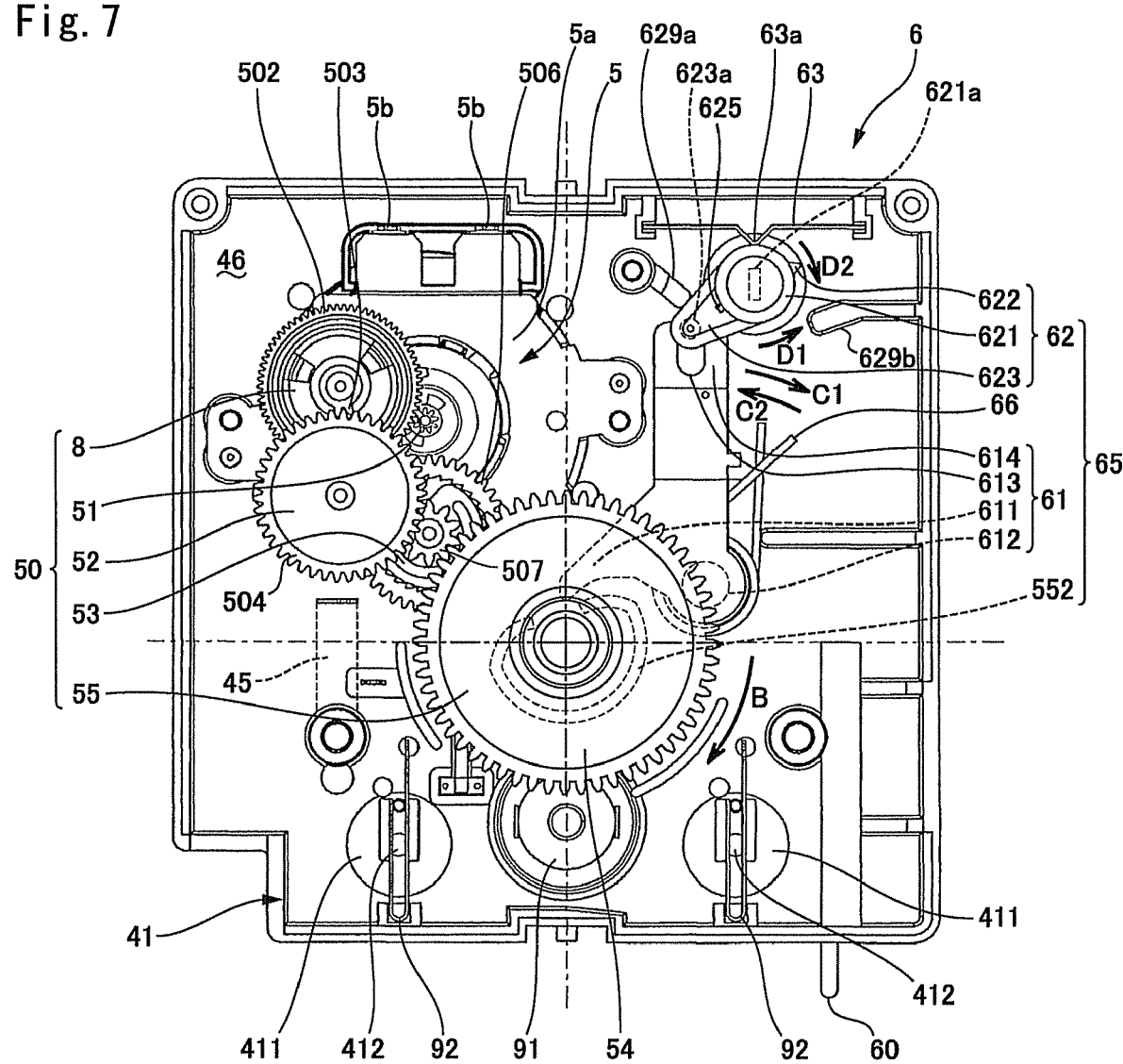
FIG. 7 is an explanatory view showing an inner case which is used in the drive unit and structural members disposed within the inner case in the ice making device shown in FIG. 1.

FIG. 7 is an explanatory view showing the inner case which is used in the drive unit and structural members disposed in the inner case in the ice making device in accordance with the embodiment. FIG. 8(A) is a side view showing a rotary cam body which is shown in FIG. 7.

As shown in FIG. 3(A), the drive unit 3 is provided with a case body 4. The motor 5, the main switch 72 structured of leaf switches, the water-supply switch 73 structured of leaf switches, the ice detecting switch 71 structured of leaf switches and the like which are described with reference to FIG. 4(A) are disposed in the inside of the case body 4. In this embodiment, the case body 4 includes an inner case 41 formed in a rectangular measure shape, a base plate 42 (first partition wall) and an outer case 43 formed in a rectangular measure shape. The case body 4 is formed by superposing edge parts of the inner case 41 and the outer case 43 on each other from both the right and left sides so as to sandwich the base plate 42. In this state, a first space 46 is partitioned and formed between the inner case 41 and the base plate 42 and a second space 47 is partitioned and formed between the outer case 43 and the base plate 42. The first space 46 and the second space 47 are respectively used for disposing following mechanisms and the like.

As shown in FIG. 7, the thermostat 91 is fixed at a bottom part of the inner case 41 in the first space 46 between the inner case 41 and the base plate 42. Further, in the ice making device 1 in this embodiment, as shown in FIG. 2(B), terminal parts 262 (engagement part for connection), which are made of an electrically insulator such as rubber, of the heater 26 are protruded from the ice tray 21 toward the drive unit 3. Further, as shown in FIG. 7, the case body 4 of the drive unit 3 is formed with recessed parts 411 (engaged portion for connection) which open toward an outer side of the inner case 41 at the bottom part of the inner case 41 on both side positions of the thermostat 91. A through hole 412 is formed in the back of the recessed part 411. Further, a connection terminal 92 is disposed at the bottom part of the inner case 41 so as to expose in the through hole 412. Therefore, after the drive unit 3 and the ice making unit 2 have been respectively assembled, the terminal parts 262 protruding from the ice tray 21 are fitted to the recessed parts 411 of the inner case 41 and, as a result, the ice making unit 2 and the drive unit 3 are connected with each other and the terminals 261 of the heater 26 are electrically connected with the connection terminals 92 at the fitting portions of the terminal parts 262 to the recessed parts 411. Further, an earth (ground) member 45 is disposed on an outer side of the bottom part of the inner case 41 at a position which is capable of abutting with the ice tray 21. When a portion where the earth member 45 is disposed is fixed to the ice tray 21 with a metal screw for earth (ground) connection in the inner case 41, ground connection to the ice tray 21 can be performed. In this state, since the thermostat 91 is abutted with a temperature detecting part 219 of the ice tray 21, the temperature of the ice tray 21 can be monitored. In addition, when the ice making unit 2 is connected with the drive unit 3, the "D"-shaped portion 230 of the rotation shaft 231 is fitted into a hole formed in "D"-shape of the rotary cam body 55 which is disposed in the inside of the case body 4. Therefore, the drive unit 3 and the ice making unit 2 are mechanically connected with each other.

As described above, in the ice making device 1 in accordance with this embodiment, when the ice making unit 2 is to be connected with the drive unit 3, members required to be electrically connected are only the terminals 261 of the heater 26 and the connection terminals 92. Therefore, the drive unit 3 and the ice making unit 2 are connected with each other only by fitting the terminal parts 262 (engagement part for connection) protruding from ice tray 21 to the recessed parts 411 (portion to be engaged for connection) of the inner case 41, and the terminals 261 of the heater 26 and the connection terminals 92 are automatically connected with each other. Further, when the ice making unit 2 is to be connected with the drive unit 3, members required to be mechanically connected are only the rotation shaft 231 and the rotary cam body 55 and, when the ice making unit 2 is connected with the drive unit 3, the "D"-shaped portion 230 of the rotation shaft 231 is automatically fitted into the connection hole 557 of the rotary cam body 55 whose inlet portion is formed in a "D"-shape in cross-section.

Therefore, after the ice making unit 2 and the drive unit 3 have been separately assembled, the ice making device 1 can be assembled only by connecting the ice making unit 2 with the drive unit 3. Accordingly, assembling steps can be simplified in comparison with a case that members for structuring the drive unit are successively and separately assembled to the ice making unit 2.

Further, according to the embodiment of the present invention, the ice making unit 2 and the drive unit 3 are connected with each other after the ice making unit 2 and the drive unit 3 have been separately manufactured. Therefore, different from a comparison method in which, after respective members are successively mounted on the ice tray 21 to complete the drive unit, a heater is mounted on the ice tray, in the embodiment of the present invention, fragments and dirt sticking to the ice tray 21 which structures the ice making unit 2 can be reduced and thus sanitary quality in the ice making device 1 is improved.

In addition, after the drive unit 3 and the ice tray 21 have been connected, it is difficult that the ice tray 21 is integrated with the heater 26 by caulking or insert-molding. However, according to this embodiment, after the ice tray 21 and the heater 26 have been integrated with each other by caulking or insert-molding, the ice making unit 2 is assembled and, after that, the ice making unit 2 can be connected with the drive unit 3.

Further, in the ice making device 1 in accordance with this embodiment, the earth (ground) member 45 is disposed on the outer side of the inner case 41 at the position where the earth member 45 is capable of abutting with the ice tray 21. Therefore, when the portion of the inner case 41 where the earth member 45 is disposed is fixed to the ice tray 21 with a metal screw having electroconductivity, grounding treatment of the ice making device 1 can be performed easily.

As shown in FIG. 3(A), the rotary cam body 55 is disposed at the bottom part of the inner case 41 in the first space 46 formed between the inner case 41 and the base plate 42. An upper end side of the rotary cam body 55 is protruded into the second space 47 formed between the base plate 42 and the outer case 43 through the through hole 421 formed in the base plate 42.

In the first space 46 formed between the inner case 41 and the base plate 42, as shown in FIG. 7, the motor 5 is disposed at the bottom part of the inner case 41 on a side of the rotary cam body 55. An AC synchronous motor is, for example, used as the motor 5. A transmission mechanism 50 for transmitting rotation of the motor 5 to the rotation shaft 231 of the ice making unit 2 is formed in the first space 46. The transmission mechanism 50 includes a rotor pinion 51 which is rotatably supported by a fixed shaft of the motor 5, a torque limiter 8 provided with an outer teeth gear 502 (input part) having a large diameter which is engaged with the rotor pinion 51, a chipped tooth gear 503 structuring an output part of the torque limiter 8, a gear body 52 provided with an outer teeth gear 504 having a large diameter which is driven by the chipped tooth gear 503, a gear body 53 provided with an outer teeth gear 506 having a large diameter which engages with an outer teeth gear (not shown) having a small diameter of the gear body 52, and the rotary cam body 55 provided with an outer teeth gear 54 having a large diameter which is engaged with an outer teeth gear 507 having a small diameter of the gear body 53. The tip end portion of the fixed shaft of the motor 5 is supported by the base plate 42. Support shafts which rotatably support the torque limiter 8, the gear body 52 and the gear body 53 are supported by an end plate 5a of the motor 5 and the base plate 42. The rotary cam body 55 is rotatably supported by the bottom part of the inner case 41 and the base plate 42.

Figure 8:
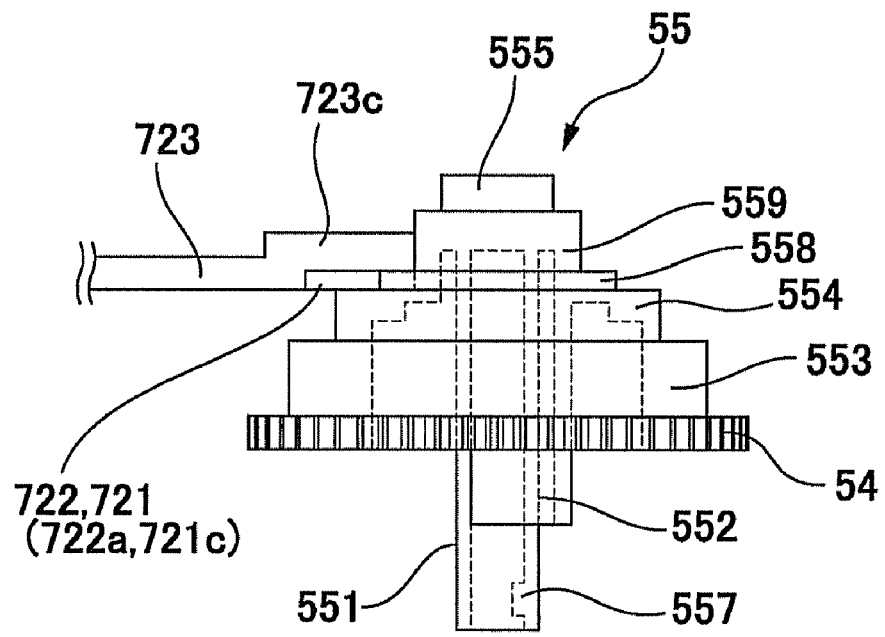
FIG. 8(A) is a side view showing a rotary cam body which is used in the ice making device shown in FIG. 1
FIG. 8(B) is an explanatory perspective view showing three leaf contact pieces which structure a main switch.
Figure 8:
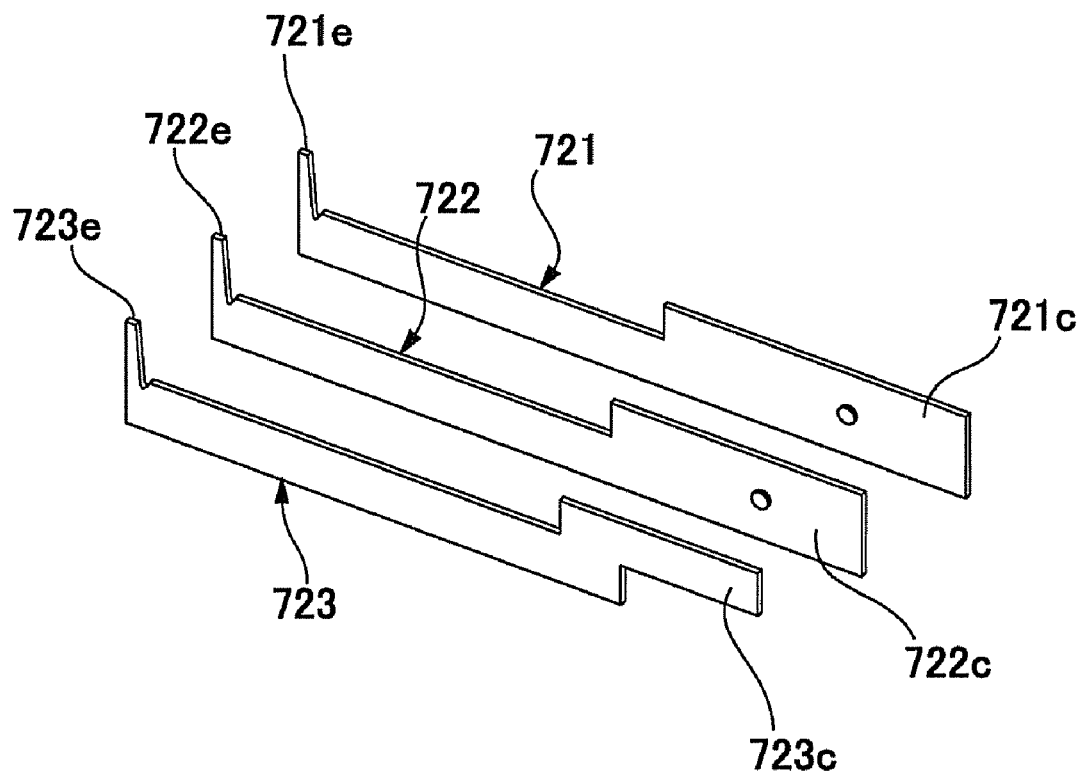

As shown in FIG. 8(A), the rotary cam body 55 is provided with a cylindrical part 551 extending downward from the outer teeth gear 54. The cylindrical part 551 is formed with a coupling hole 557 in a "D"-shape in cross section at its inlet portion. The "D"-shaped portion 230 of the rotation shaft 231 is fitted into the coupling hole 557 to transmit rotation of the rotary cam body 55 to the rotation shaft 231.

Figure 9A:
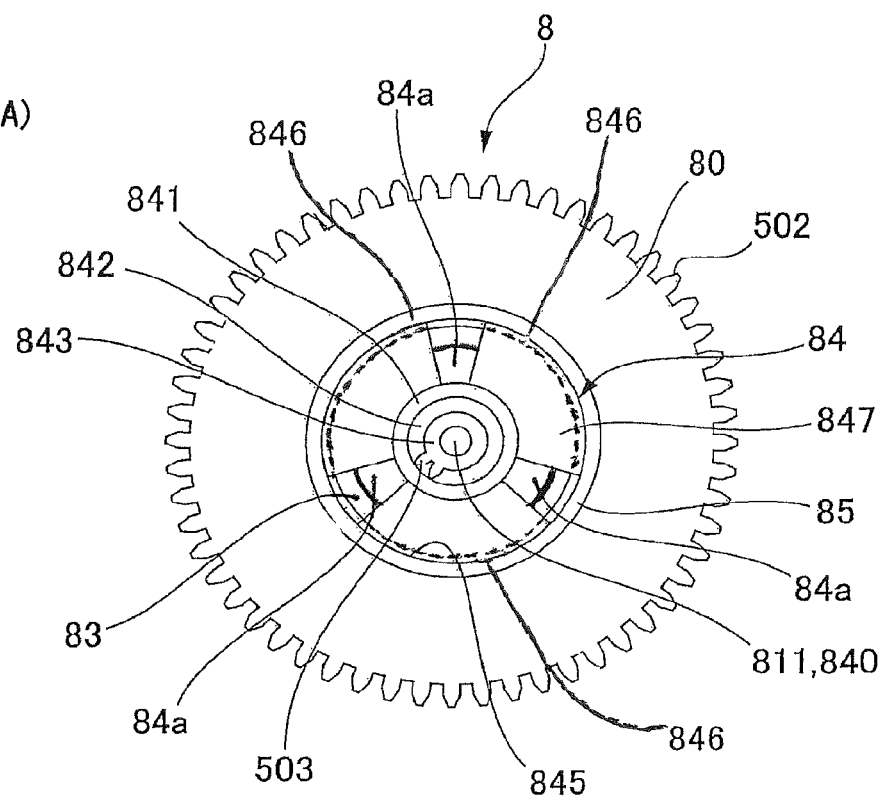
FIG. 9(A) is a plan view showing a torque limiter which is provided in the ice making device in accordance with an embodiment of the present invention and FIG. 9(B) is its exploded perspective view.
Figure 9B:
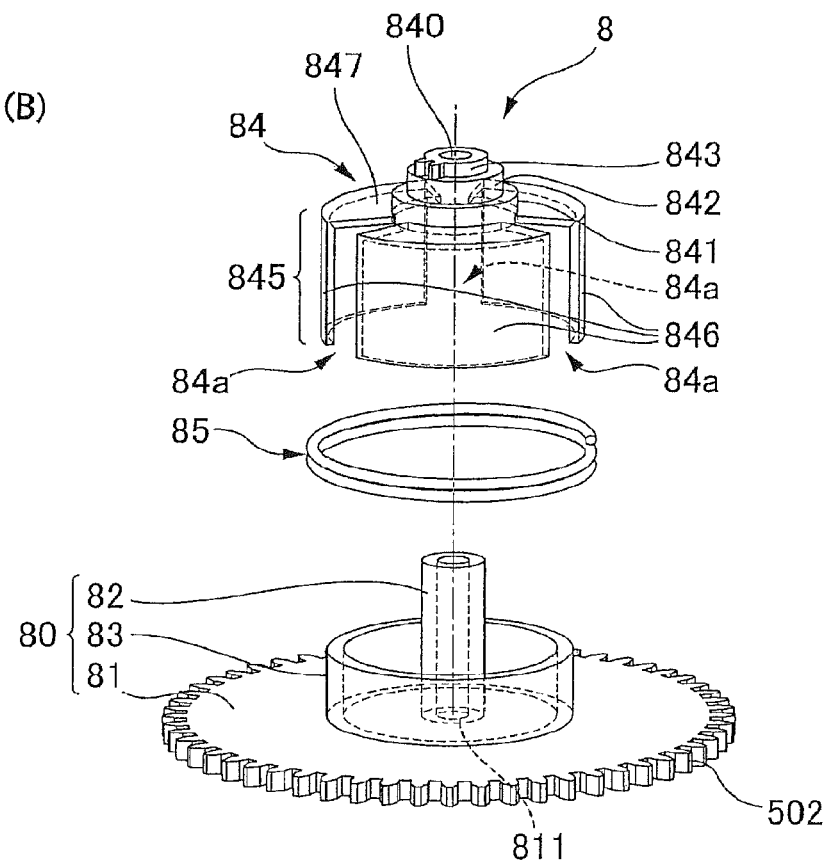

FIG. 9(A) is a plan view showing the torque limiter which is provided in the ice making device in accordance with an embodiment of the present invention and FIG. 9(B) is its exploded perspective view.

In the ice making device 1 in this embodiment, when the raking parts 232 formed on the rotation shaft 231 of the ice making unit 2 is going to move to rake ice pieces formed in the ice tray 21 out, the ice pieces may not be separated from the ice tray 21 immediately after heating is started by the heater 26. In this state, when the rotation shaft 231 is turned to going to rake the ice pieces in the ice tray 21 out by the raking parts 232, a large load is applied to the raking parts 232 by unmoved ice pieces. Therefore, an excessive load is applied to the transmission mechanism 50 for transmitting a rotary force of the motor 5 to the rotation shaft 231 and thus a gear structuring the transmission mechanism 50 may be damaged. In order to prevent the problem described above, in this embodiment, as shown in FIG. 7, the torque limiter 8 which will be described below is structured on a motor side of the transmission mechanism 50.

As shown in FIG. 7 and FIGS. 9(A) and 9(B), the torque limiter 8 includes a gear body 80 (first member) made of resin, a cup-shaped sliding member 84 (second member) made of resin, and a coil spring 85 (ring-shaped urging member). The gear body 80 is provided with a large diameter circular plate part 81 formed with the outer teeth gear 502. A small diameter cylindrical part 82 is formed upright at a center portion of an upper face of the large diameter circular plate part 81 and a large diameter cylindrical part 83 is formed so as to surround the small diameter cylindrical part 82. The gear body 80 is formed with a shaft hole 811 so as to penetrate through the large diameter circular plate part 81 and the small diameter cylindrical part 82. A support shaft (not shown) whose both ends are supported by the end plate 5a of the motor 5 and the base plate 42 is fitted to the shaft hole 811. Therefore, the gear body 80 is capable of being driven by the rotor pinion 51 to be rotated around the support shaft.

The sliding member 84 is formed in a cup shape which opens toward the gear body 80. The sliding member 84 includes an upper base part 847 (bottom plate part) and a cylindrical drum part 845 extending perpendicularly downward from an outer peripheral edge of the upper base part 847. Therefore, in a state where the sliding member 84 is assembled on the gear body 80, the cylindrical drum part 845 of the sliding member 84 is fitted so as to surround a circumferential face of the large diameter cylindrical part 83 of the gear body 80. The upper base part 847 of the sliding member 84 is formed in a multi-stage shape including a large diameter part 841, a middle diameter part 842 and a small diameter part 843 which are formed in this order. A chipped tooth gear 503 is formed on a side face of the small diameter part 843. A hole into which the small diameter cylindrical part 82 of the gear body 80 is fitted is formed in the inside of the large diameter part 841 and the middle diameter part 842. The small diameter part 843 is formed with a shaft hole 840 into which a support shaft penetrating through the small diameter cylindrical part 82 is fitted. Therefore, the sliding member 84 is also rotatable around the support shaft. In this case, the sliding member 84 is supported by the small diameter cylindrical part 82.

An As seen in FIGS. 13(A) and 13(B), an inner diameter dimension of the cylindrical drum part 845 of the sliding member 84 is set to be a little larger than the outer diameter dimension of the large diameter cylindrical part 83 of the gear body 80 to have a specified clearance between them. The cylindrical drum part 845 of the sliding member 84 is formed with three cutout parts 84a which are extended in an axial direction from its tip end portion with an equal angular interval. Therefore, the cylindrical drum part 845 is divided into three elastic plate parts 846 in a tongue shape which are separated in a circumferential direction by the cutout parts 84a. Accordingly, in a state that the sliding member 84 is assembled on the gear body 80 such that the cylindrical drum part 845 surrounds around the large diameter cylindrical part 83 of the gear body 80, when the coil spring 85 is mounted around the cylindrical drum part 845 (elastic plate parts 846), the elastic plate parts 846 are elastically deformed to an inner side or a center side to abut with the outer circumferential face of the large diameter cylindrical part 83. As a result, when the gear body 80 is rotated and a large load is not applied to the sliding member 84, the sliding member 84 is rotated together with the gear body 80. On the contrary, when the gear body 80 is rotated but a large load is applied to the sliding member 84, slip occurs between the elastic plate parts 846 and the large diameter cylindrical part 83 and thus rotation of the gear body 80 is not transmitted to the sliding member 84.

The coil spring 85 is mounted only at a lower end portion of the cylindrical drum part 845 (tip end portions of the elastic plate parts 846). The cutout part 84a is extended to a root portion of the large diameter part 841 in the upper base part 847 of the sliding member 84, and the upper base part 847 is also divided into three portions by the cutout parts 84a to form base parts of the elastic plate part 846. Therefore, the elastic plate part 846 of the sliding member 84 is formed in a perpendicularly bent shape from the upper base part 847 and, in addition, an axial dimension of the cylindrical drum part 845 is set to be longer than a dimension in a radial direction of the upper base part 847. Accordingly, the elastic plate part 846 has a high rigidity in the circumferential direction but its rigidity in the radial direction is low and thus the elastic plate part 846 can be elastically deformed easily toward a center side. Further, in order to make the elastic plate parts 846 easily and elastically deformed on a center side, the cutout part 84a which is formed from the tip end of the cylindrical drum part 845 to a middle portion of the upper base part 847 is formed such that a length of the cutout part formed in the cylindrical drum part 845 is longer than a length of the cutout part formed in the upper base part 847.

As described above, in the ice making device 1 in this embodiment, the torque limiter 8 is structured at a first stage of the transmission mechanism 50 (on the side nearer to a drive source in the transmission mechanism 50) and thus a torque applied to the torque limiter 8 is small.

In the sliding member 84 of the torque limiter 8, the cutout part 84a is formed from the cylindrical drum part 845 to the upper base part 847. Therefore, since the length of the elastic plate part 846 is long, the elastic plate part 846 has a high rigidity in the circumferential direction but has a low rigidity in the radial direction. Accordingly, the elastic plate parts 846 are easily bent resiliently when the coil spring 85 is mounted around the cylindrical drum part 845. As a result, rigidity of the elastic plate part 846 does not exert large influence on the friction torque and the friction torque is roughly determined only by an urging force of the coil spring 85. Therefore, when dimension of the gear body 80 made of resin and dimension of the cup-shaped sliding member 84 made of resin are varied, or even when rigidity of the elastic plate part 846 is varied with an elapse of time or due to ambient temperature, the variation of the friction torque is reduced. Especially, the ice making device 1 in this embodiment is used in a refrigerator or in a freezer and, on the other hand, the ice making device 1 is often warmed by the heater 26. Therefore, the rigidity of the elastic plate part 846 made of resin is easily varied but, even in this case, the torque limiter 8 is operated surely.

In this embodiment, only the tip end portions of the elastic plate parts 846 are pressed by the coil spring 85 toward the outer circumferential face of the large diameter cylindrical part 83 and thus the elastic plate parts 846 are easily deformed. Moreover, the torque limiter 8 is simply structured and thus effect of accuracy of its structural parts is small. Further, when a spring having a small spring constant can be used as the coil spring 85 so as to be elastically deformed largely, the torque limiter 8 is surely operated even though part accuracy of the sliding member 84 is low. In addition, since the coil spring 85 can provide a stable urging force, a stable friction torque is obtained.

In this embodiment, it is structured that the large diameter part 841, the middle diameter part 842 and the small diameter part 843 are superposed in this order on the upper base part 847 of the sliding member 84. A hole into which the small diameter cylindrical part 82 of the gear body 80 is fitted is formed on an inner side of the large diameter part 841 and the middle diameter part 842. Further, the small diameter part 843 is formed with a shaft hole 840 into which the support shaft penetrating through the small diameter cylindrical part 82 is fitted. Therefore, the sliding member 84 and the gear body 80 are supported by the common support shaft and the sliding member 84 is rotated in a state that the sliding member 84 is supported by the small diameter cylindrical part 82 of the gear body 80. Accordingly, the sliding member 84 and the gear body 80 are rotated with surely maintaining a coaxial state.

Figure 10:
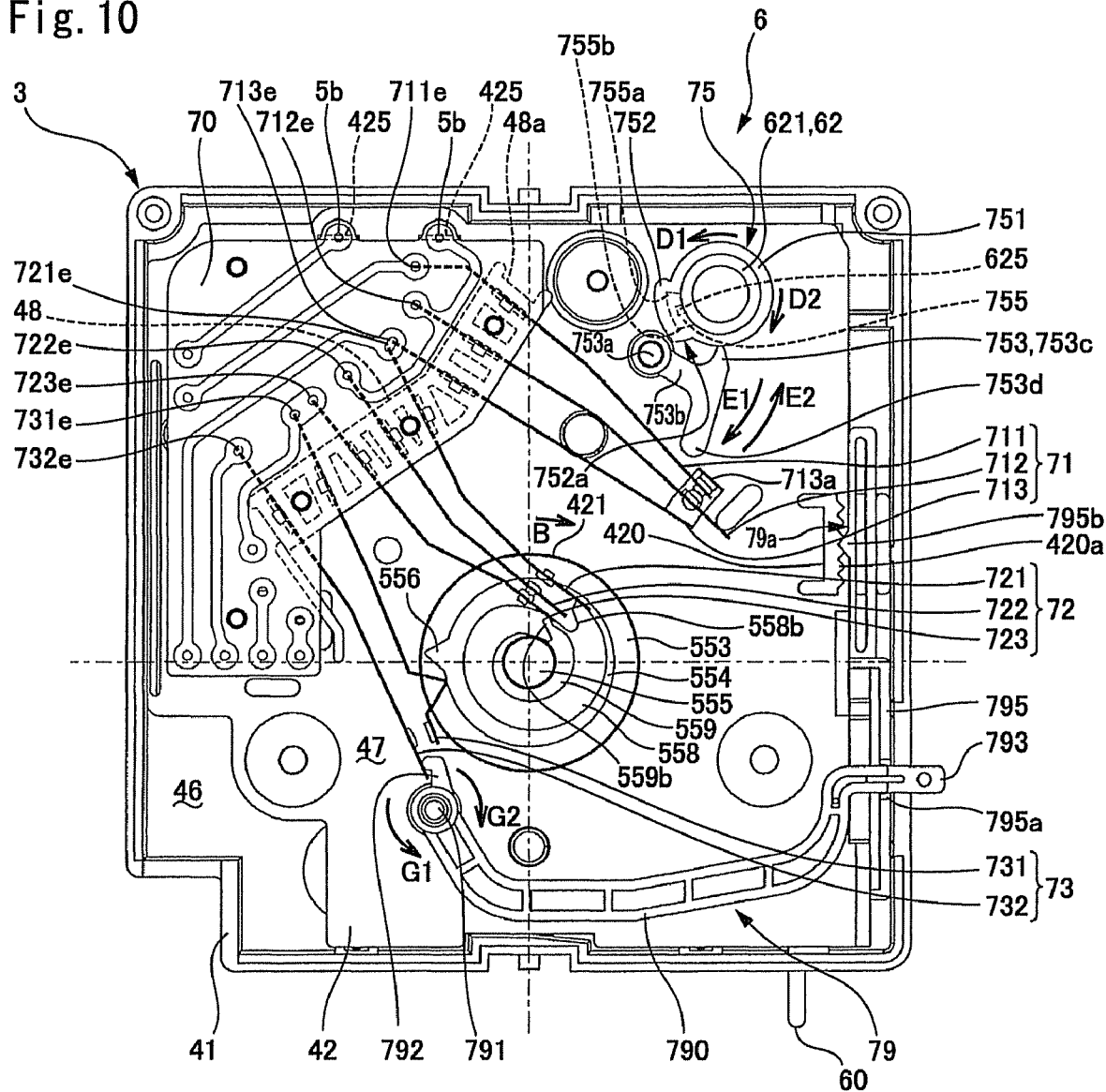
FIG. 10 is an explanatory view showing a base plate used in the drive unit and structural members which are disposed on an outer case side of the base plate in the ice making device shown in FIG. 1.

FIG. 10 is an explanatory view showing the base plate used in the drive unit and structural members which are disposed on the outer case side of the base plate in the ice making device in the embodiment.

In this embodiment, an ice detecting mechanism 6 for detecting ice quantity in the ice storage part 1a through the ice detecting lever 60 shown in FIG. 1 is structured by utilizing the first space 46 between the inner case 41 and the base plate 42 and the second space 47 between the base plate 42 and the outer case 43, which are shown in FIG. 3(A).

In this embodiment, the ice detecting mechanism 6 includes generally, a lever drive mechanism 65 as shown in FIG. 7 which is structured by utilizing the first space 46 between the inner case 41 and the base plate 42, and a lever position detecting mechanism 75 which is structured by utilizing the second space 47 between the base plate 42 and the outer case 43, and an ice detecting switch 71 which is structured by utilizing the second space between the base plate 42 and the outer case 43, which are shown in FIG. 10. "ON" and "OFF" operations of the ice detecting switch 71 are performed by the lever position detecting mechanism 75.

As shown in FIG. 7 and FIG. 8(A), the lever drive mechanism 65 includes a cam part 552 formed around a cylindrical part 551 which is formed on a lower end side of the rotary cam body 55, a first drive lever 61 which is driven by a cam face of the cam part 552 to move the ice detecting lever 60, a coiled torsion spring 66 which urges the first drive lever 61, and a second drive lever 62 which holds an end part of the ice detecting lever 60.

The first drive lever 61 is provided with a pawl part 611 capable of abutting with the cam part 552, a cylindrical support shaft 612 extending in an axial direction, and a transmitting part 614 which is located on an opposite side to the pawl part 611 with respect to the support shaft 612. A "U"-shaped cutout part 613 is formed in the transmitting part 614. Therefore, when the rotary cam body 55 is turned by rotation of the motor 5 to turn the cam part 552, the pawl part 611 is pushed by the cam part 552 and the first drive lever 61 is turned around the support shaft 612 by a specified angle in a direction shown by the arrow "C1" in FIG. 7 against an urging force of the coiled torsion spring 66. Further, when a small diameter portion of the cam face abuts with the pawl part 611, the first drive lever 61 is turned around the support shaft 612 in a reverse direction shown by the arrow "C2" by the urging force of the coiled torsion spring 66 to return to its original position.

The second drive lever 62 is provided with a cylindrical part 621 having a slit 621a for holding an end part of the ice detecting lever 60, a transmitting projection 623 which is protruded from a side face of the cylindrical part 621, and a small projection 622 which is protruded from the side face of the cylindrical part 621 on an opposite side to the transmitting projection 623. A pin 623a which is protruded from an under face of the transmitting projection 623 is fitted into a "U"-shaped cut-out part 613 which is formed in the first drive lever 61. Therefore, when the first drive lever 61 is turned in the direction shown by the arrow "C1", the second drive lever 62 is turned around the cylindrical part 621 in the direction shown by the arrow "D1". On the other hand, when the first drive lever 61 is turned in the direction shown by the arrow "C2", the second drive lever 62 is turned around the cylindrical part 621 in the direction shown by the arrow "D2". As a result, the ice detecting lever 60 is driven. In accordance with this embodiment, the base plate 42 is formed with a stopper 629a, which prevents the transmitting projection 623 of the second drive lever 62 from turning more than a prescribed position in the direction shown by the arrow "D2", and a stopper 629b which prevents the transmitting projection 623 from turning more in the direction shown by the arrow "D1".

A flat spring 63 is disposed at a side position of the cylindrical part 621 and, when the ice detecting lever 60 is lifted upward with a manual operation, the small projection 622 of the second drive lever 62 goes over a projected part 63a of the flat spring 63 to maintain a lifted state of the ice detecting lever 60. As a result, the ice making device 1 becomes to be a similar state to the ice full state and thus an operation of the ice making device 1 is stopped.

As shown in FIG. 10, an upper half portion of the cylindrical part 621 of the second drive lever 62 is penetrated through the base plate 42 and located at a second space 47 between the base plate 42 and the outer case 43. The lever position detecting mechanism 75 includes a projection 625 (engagement part) that is formed on the outer peripheral face of an upper end portion of the cylindrical part 621 (rotation shaft) in the second drive lever 62 (driving member), a driven ring 751 (driven member) which is put on around the upper end of the cylindrical part 621 on the base plate 42, and a pressing lever 753 (transmitting member) whose positions are changed by a protruded part 752 which is protruded from an outer peripheral face (cam face) of the driven ring 751. The pressing lever 753 is provided with a cylindrical part 753a which is fitted to a protruded part that is formed in the base plate 42, a connection part 753b which is extended from the cylindrical part 753a, a first protruded part 753c which protrudes to the driven ring 751 side from a tip end portion of the connection part 753b, and a second protruded part 753d which protrudes to an opposite side to the first protruded part 753c from the tip end part of the connection part 753b.

In the lever position detecting mechanism 75, a cut-out part 755 (recessed part) which is extended in a peripheral direction is formed on a rear face side of the protruded part 752 of the driven ring 751 and on an inner peripheral side of a hole through which the cylindrical part 621 is penetrated. The projection 625 that is formed on the cylindrical part 621 of the second drive lever 62 is located within the inside of the cut-out part 755 with a constant play to end parts 755a and 755b in the peripheral direction of the cut-out part 755. Therefore, a transmission part through which movement of the second drive lever 62 is transmitted to the driven ring 751 is formed between the second drive lever 62 and the driven ring 751 so as to be apart from each other in the peripheral direction by a prescribed dimension.

In the lever position detecting mechanism 75 structured as described above, when the second drive lever 62 is turned in the direction of the arrow "D1" (when the ice detecting lever 60 is lifted), the movement of the second drive lever 62 is transmitted to the driven ring 751 by the projection 625 which abuts with the end part 755b located on the side shown by the arrow "D1" in the peripheral direction of the cut-out part 755. As a result, the driven ring 751 is turned in the direction shown by the arrow "D1" in conjunction with the second drive lever 62. Accordingly, the first protruded part 753c of the pressing lever 753 is moved from a state, that the first protruded part 753c abuts with a peripheral face (low portion of the driven member) of the driven ring 751 where the protruded part 752 is not formed, to a state that the first protruded part 753c abuts with a slant face 752d of the protruded part 752, which is just before abutting with an outer peripheral face of the protruded part 752 (high portion of the driven member). As a result, the pressing lever 753 is turned around the cylindrical part 753a in a direction shown by the arrow "E1" and the second protruded part 753d causes the ice detecting switch 71 to perform "ON" and "OFF" operation.

In this embodiment, the ice detecting switch 71 is a leaf switch which is comprised of three leaf contact pieces 711, 712 and 713. The pressing lever 753 abuts with only the leaf contact piece 711 among three leaf contact pieces 711, 712 and 713 to cause it to move. More specifically, when the second protruded part 753d of the pressing lever 753 is in a non-abutting state, the leaf contact piece 711 is abutted with an end part 713a of the leaf contact piece 713 which is extended to an opposite side to the leaf contact piece 711 with respect to the leaf contact piece 712 so as to face the leaf contact piece 711 and thus the leaf contact piece 711 and the leaf contact piece 713 are in a contact state with each other. On the other hand, when the leaf contact piece 711 is pressed by the second protruded part 753d of the pressing lever 753, the leaf contact piece 711 is deformed to a side of the leaf contact piece 712 and thus the leaf contact piece 711 is moved apart from the end part 713a of the leaf contact piece 713 to be in a contact state with the leaf contact piece 712.

In the ice detecting mechanism 6 structured as described above, the leaf contact piece 711 is abutted with the end part 713a of the leaf contact piece 713 before the motor 5 is started and rotated. In order to detect an ice quantity in the ice storage part 1a, when the rotary cam body 55 is turned by the motor 5 to turn the first drive lever 61 in the direction shown by the arrow "C1", the second drive lever 62 is turned around the cylindrical part 621 in the direction shown by the arrow "D1". As a result, the ice detecting lever 60 is turned as shown by the arrow "F1" in FIGS. 3(A) and 3(B), and its end part goes up. In this case, the second drive lever 62 is turned in the direction shown by the arrow "D1" and the driven ring 751 is also turned in the direction shown by the arrow "D1". Therefore, the protruded part 752 of the driven ring 751 is abutted with the first protruded part 753c of the pressing lever 753 to cause the pressing lever 753 to turn in the direction shown by the arrow "E1" and a state is obtained where the leaf contact piece 711 is contacted with the leaf contact piece 712. Further, in a state that the pressing lever 753 is abutted with the protruded part 752 of the driven ring 751, the leaf contact pieces 711 and 712 are stably contacted with each other.

When the rotary cam body 55 is further turned by the rotation of the motor 5, the first drive lever 61 is turned in a reverse direction shown by the arrow "C2" and the second drive lever 62 is going to turn around the cylindrical part 621 in a direction shown by the arrow "D2". As a result, the ice detecting lever 60 is going to turn and go down as shown by the arrow "F2" in FIGS. 3(A) and 3(B).

In this case, when ice pieces are insufficient in the ice storage part 1a, moving of the ice detecting lever 60 downward is permitted and thus the second drive lever 62 is capable of turning in the direction shown by the arrow "D2" to cause the protruded part 625 to press the end part 755a of the cutout part 755 and thus the driven ring 751 is turned in the direction shown by the arrow "D2". Accordingly, when a timing at which the first protruded part 753c of the pressing lever 753 starts to abut with the slant face 752a of the protruded part 752 of the driven ring 751 is set to be a boundary position between a shortage state and a full state of ice pieces in the ice storage part 1a, ice quantity in the ice storage part 1a can be detected on the basis of an "ON" or "OFF" operation by using the ice detecting switch 71.

In this embodiment, the driven ring 751 is moved with a play with respect to the second drive lever 62. Therefore, even when the second drive lever 62 starts to turn in a reverse direction shown by the arrow "D2" after the second drive lever 62 has been turned in the direction shown by the arrow "D1", the protruded part 625 moves only in the inside of the cutout part 755 and thus the driven ring 751 is not moved. However, since the leaf contact piece 711 applies an urging force, which is going to cause the leaf contact piece 711 to return from its elastically deformed state, to the pressing lever 753, when the second drive lever 62 is turned in the direction shown by the arrow "D2", the pressing lever 753 presses the slant face 752a formed in the protruded part 752 of the driven ring 751 to move the driven ring 751 in the direction shown by the arrow "D2". Therefore, the driven ring 751 is moved before the driven ring 751 is driven by the second drive lever 62. Accordingly, the leaf contact piece 711 can be quickly returned from the elastically deformed state even before the driven ring 751 is driven by the second drive lever 62. As a result, in the ice detecting switch 71, the leaf contact piece 711 quickly returns to a state where the leaf contact piece 711 contacts with the end part 713a of the leaf contact piece 713. Therefore, even when an operation is transmitted to the ice detecting switch 71 through the cam mechanism, an unstable region is not occurred in the ice detecting switch 71 where a state that the leaf contact pieces 711, 712, 713 are contacted is not clearly different from a state that they are separated. Accordingly, an electric obstacle does not occur.

When ice pieces are in a full state in the ice storage part 1a, moving of the ice detecting lever 60 downward is prevented by the ice pieces. Therefore, turning of the second drive lever 62 in the direction shown by the arrow "D2" is prevented and thus the leaf contact piece 711 maintains to have contacted with the leaf contact piece 712. After the ice detecting lever 60 is prevented from moving down by the ice pieces, the first drive lever 61 is prevented from turning in the direction shown by the arrow "C2". Therefore, the pawl part 611 of the first drive lever 61 does not follow the cam part 552 of the rotary cam body 55 in the "C2" direction and thus the ice detecting lever 60 does not go down from a position restricted by the ice pieces even when the rotary cam body 55 is turned.

FIG. 8(B) is an explanatory perspective view showing three leaf contact pieces which structure the main switch 72. In this embodiment, the main switch 72 is structured by utilizing the second space 47 formed between the base plate 42 and the outer case 43 shown in FIG. 3(A). In order to structure the main switch 72, an upper half portion of the rotary cam body 55 is utilized which protrudes from the first space 46 to the second space 47 through the through hole 421 of the base plate 42. In other words, the rotary cam body 55 includes a large diameter part 553, a middle diameter part 554 having a smaller diameter than the large diameter part 553, a first cam part 558 having a smaller diameter than the middle diameter part 554, a second cam part 559 having a smaller diameter than the first cam part 558, and a small diameter part 555 having a smaller diameter than the second cam part 559, which are formed upward in this order to be in a multistage shape from the outer teeth gear 54. This multistage portion is disposed in the second space 47. Both of side faces of the first cam part 558 and the second cam part 559 are formed to be cam faces provided with stepped parts 558b and 559b whose diameters are sharply varied in their circumferential direction. The diameters of these cam faces increase in a direction shown by the arrow "B" from the stepped parts 558b and 559b. Further, positions of the stepped parts 558b and 559b of the first cam part 558 and the second cam part 559 are shifted from each other in a circumferential direction and the stepped part 559b is located backward to the stepped part 558b in the direction shown by the arrow "B". In this embodiment, the middle diameter part 554 is formed with a protruded part 556 for operating a leaf contact piece of a water-supply switch 73 described below.

As shown in FIGS. 8(A) and 8(B), three leaf contact pieces 721, 722 and 723 which structure the main switch 72 (leaf switch) are disposed on the base plate 42 so as to extend toward the rotary cam body 55. The leaf contact piece 723 is disposed at a position nearest to a center axial line of the rotary cam body 55, the leaf contact piece 722 is disposed on its outer side, and the leaf contact piece 721 is disposed on its further outer side. A tip end part 723c of the leaf contact piece 723 is elastically abutted with a side face of the second cam part 559. Further, in an initial state, a tip end part 722c of the leaf contact piece 722 is dropped in a low portion of the stepped part 558b to elastically contact with the leaf contact piece 723. On the other hand, a tip end part 721c of the leaf contact piece 721 is elastically abutted with a side face of the first cam part 558.

The leaf contact piece 723 is straightly and horizontally extended from its base end side and then perpendicularly turned upward and, after that, the leaf contact piece 723 is extended horizontally again. A lower edge of the tip end part 723c is capable of sliding on an upper face of the first cam part 558.

The leaf contact pieces 721 and 222 are formed in a shape such that their base end portions are straightly extended at the same height position as that of the base end portion of the leaf contact piece 723 and the widths of the tip end parts 721c and 722c are enlarged in an upward direction. Upper edge portions of the tip end parts 721c and 722c are set at the same height position as that of the upper edge portion of the tip end part 723c of the leaf contact piece 723. Further, a front edge of the leaf contact piece 721 is slightly extended and protruded to a front end side from a front edge of the leaf contact piece 722. When the rotary cam body 55 is turned in the direction as shown by the arrow "B", the tip end parts 721c and 722c of the leaf contact pieces 721 and 222 structured as described above move along the side face of the first cam part 558 and the underside edges of the tip end parts 721c and 722c slide on the upper face of the middle diameter part 554.

In an initial state of the main switch 72 structured as described above, the leaf contact piece 723 is located at a higher portion of the stepped part 559b and the leaf contact piece 722 is located at a lower portion of the stepped part 558b and thus the leaf contact piece 722 contacts with the leaf contact piece 723. When the rotary cam body 55 is turned in the direction shown by the arrow "B" from this state, the tip end part 723c of the leaf contact piece 723 drops on a lower portion of the stepped part 559b and thus the leaf contact piece 722 is separated from the leaf contact piece 723. Further, immediately before the tip end part 723c of the leaf contact piece 723 drops on the lower portion of the stepped part 559b, the tip end part 721c of the leaf contact piece 721 drops on a lower portion of the stepped part 558b and thus the leaf contact piece 721 is connected to the leaf contact piece 722. When the rotary cam body 55 is further turned in the direction as shown by the arrow "B", the leaf contact pieces 721, 722 and 723 will be shifted to a state that they are located at higher portions of the stepped parts 559b and 558b and then return to the initial state.

In this embodiment, a water supply switch 73 shown in FIG. 10 (leaf switch) is structured by utilizing a second space 47 between the base plate 42 and the outer case 43 shown in FIG. 3(A). Similarly to the main switch 72, the water supply switch 73 is also structured by utilizing the upper half portion of the rotary cam body 55 which protrudes into the second space 47 from the first space 46 through the through hole 421 of the base plate 42. In other words, a projection 556 is formed on a side face of the middle diameter part 554 and, on the other hand, two leaf contact pieces 731 and 732 are extended toward the middle diameter part 554 of the rotary cam body 55.

In the water supply switch 73 structured as described above, the leaf contact piece 731 is separated from the leaf contact piece 732 in the initial state, which is in an "OFF" state. From this state, when the rotary cam body 55 is turned in the direction shown by the arrow B and the leaf contact piece 731 is pressed by the projection 556 toward the leaf contact piece 732, the leaf contact piece 731 and the leaf contact piece 732 come into contact with each other to be in an "ON" state. When the rotary cam body 55 is further turned in the direction shown by the arrow "B" and the leaf contact piece 731 returns to its original position, the leaf contact piece 731 is separated from the leaf contact piece 732 to return to an "OFF" state.

In this embodiment, a water supply amount adjust mechanism 79 for adjusting "ON"/"OFF" timing with the water supply switch 73 is structured on the base plate 42. The water supply amount adjust mechanism 79 is provided with an arch-shaped input lever 790 (operation member) for adjusting a position of the leaf contact piece 732. The input lever 790 includes a cylindrical part 791 into which a support shaft protruding from the base plate 42 is fitted, a pawl part 792 abutting with the tip end part of the leaf contact piece 732 at its tip end side, and an operation part 793 protruding outside of the case body 4 on an opposite side to the pawl part 792 with respect to the cylindrical part 791. When the operation part 793 is moved along an edge of the base plate 42, as shown by the arrows "G1" and "G2", the input lever 790 is turned around the cylindrical part 791 to change the position of the pawl part 792. Therefore, when the input lever 790 is turned in the direction shown by the arrow "G1", the tip end side of the leaf contact piece 732 is resiliently bent in a direction which is separated from the leaf contact piece 731 and thus a timing when the water supply switch 73 is changed from an "OFF" state to an "ON" state becomes late and a timing changed from the "ON" state to the "OFF" state becomes early. Accordingly, a water supply time period from the water-supply part 22 to the ice tray 21 which is described with reference to FIG. 1 is shortened and thus an amount of water supply to the ice tray 21 is decreased to be capable of making smaller ice pieces. On the other hand, when the input lever 790 is turned in a direction shown by the arrow "G2", the tip end side of the leaf contact piece 732 is resiliently bent in a direction coming close to the leaf contact piece 731 and thus a timing when the water supply switch 73 is changed from an "OFF" state to an "ON" state becomes early and a timing changed from the "ON" state to the "OFF" state becomes late. As a result, a water supply time period from the water-supply part 22 to the ice tray 21 becomes longer and thus an amount of water supply to the ice tray 21 is increased to be capable of making larger ice pieces.

An end portion of the input lever 790 near the operation part 793 is fitted into a "U"-shaped groove 795a of the support plate 795. The support plate 795 is structured so as to slide along an edge portion of the base plate 42. Further, the support plate 795 is formed with a protruded part 795b on its inner side face and, on the other hand, a plate part 420 which is formed along the edge portion of the base plate 42 is formed with a plurality of grooves 420a which is capable of engaging with the protruded part 795b. A click mechanism 79a is structured by the protruded part 795b and the grooves 420a. Therefore, when the input lever 790 is operated, the support plate 795 slides along the edge portion of the base plate 42 and the protruded part 795b of the support plate 795 is moved over a portion between the grooves 420a of the plate part 420 and thus a click feeling can be obtained. In addition, the input lever 790 is held at a prescribed position by the protruded part 795b engaging with the groove 420a.

According to the water supply amount adjust mechanism 79 as described above, a spaced distance between the leaf contact pieces 731 and 732 can be adjusted only by deforming the tip end side of the leaf contact piece 732 to change its position and thus timings when the water-supply switch 73 is turned "ON" or "OFF" can be adjusted. Therefore, when an amount of water (size of an ice piece) supplied to the ice tray 21 is to be adjusted, the amount of water can be easily adjusted from the outside, which is different from a case that a micro switch is used for the water-supply switch 73. In addition, since both the water-supply switch 73 and the water supply amount adjust mechanism 79 are mounted on the base plate 42, assembling is easily performed with a high degree of positional accuracy. Further, as described below, both the leaf contact pieces 731 and 732 are held with the contact piece holding part 48 which is structured on the base plate 42 and thus assembling is easily performed.

In accordance with an embodiment, both of the leaf contact pieces 731 and 732 may be deformed as the water supply amount adjust mechanism 79 and, alternatively, the leaf contact piece 731 which is driven by the rotary cam body 55 may be deformed as the water supply amount adjust mechanism 79. However, in this embodiment, the leaf contact piece 732 which is not moved by the rotary cam body 55 is deformed by the input lever 790. Therefore, a timing of the leaf contact piece 731 which is driven by the rotary cam body 55 is not varied and thus the water-supply switch 73 is surely operated.

Next, an operation of the drive unit will be briefly described below with reference to FIGS. 11(A) through 11(F) while related to a total operation described with reference to FIG. 3(A) through FIG. 5(D). FIGS. 11(A) through 11(F) are explanatory views showing operations of the drive unit.

In the initial state, positions of the rotary cam body 55, the first drive lever 61, the second drive lever 62, the pressing lever 753, the leaf contact piece 723, and the leaf contact piece 731 are set as shown in FIG. 11(A). In this state, a position of the ice detecting lever 60 is located at the lowest position. Further, the raking parts 232 of the raking member 23 are located at an angle of about 20° with respect to a horizontal direction.

At the time point of "T0" shown in FIG. 6, when the thermostat 91 becomes to an "ON" state, energization to the motor 5 and the heater 26 is started and the rotary cam body 55 is turned. As a result, the raking member 23 starts to turn in the direction shown by the arrow "A" in FIG. 11(A).

Next, at the time point of "T1" shown in FIG. 6, as shown in FIG. 11(B), the leaf contact piece 721 is dropped from the step 558b immediately after the raking parts 232 have been located at an angle of about 10° with respect to the horizontal direction and thus the main switch 72 is changed to the second state from the first state.

Next, at the time point of "T2" shown in FIG. 6, the turning of the rotary cam body 55 is transmitted to the ice detecting lever 60 through the first drive lever 61 and the second drive lever 62 and, as shown by the arrow "F1" in FIG. 11(C), the ice detecting lever 60 goes up.

Next, at the time period of "T3" shown in FIG. 6, the turning of the rotary cam body 55 is transmitted to the ice detecting lever 60 through the first drive lever 61 and the second drive lever 62 and, when the ice storage part 1a is in a shortage state of ice pieces, the ice detecting lever 60 goes down as shown by the arrow "F2" in FIG. 11(D).

Next, at the time point of "T5" shown in FIG. 6, the turning of the rotary cam body 55 is transmitted to the leaf contact piece 731 and water is supplied to the ice tray 21 during the time periods shown in FIGS. 11(E) and 11(F). Then, the rotary cam body 55, the first drive lever 61, the second drive lever 62, the pressing lever 753, the leaf contact piece 723, the leaf contact piece 731 and the like return to their original positions.

Figure 12:
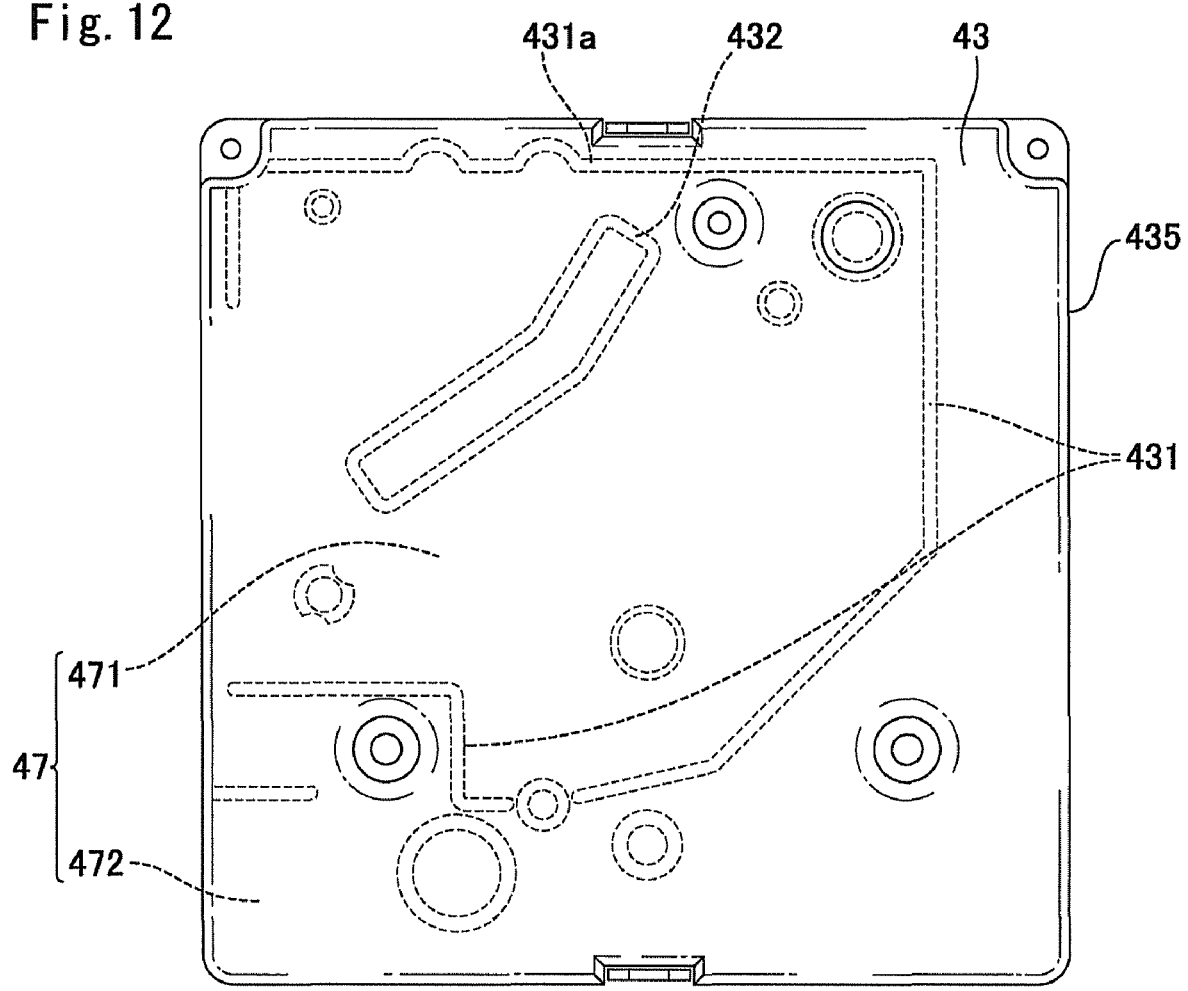
FIG. 12 is an explanatory view showing an outer case used in the ice making device shown in FIG. 1 which is viewed from an outer side.

FIG. 12 is an explanatory view showing the outer case used in the ice making device in accordance with an embodiment which is viewed from an outer side. In this embodiment, the ice detecting switch 71, the main switch 72 and the water-supply switch 73 is structured by using a strip-shaped leaf contact pieces 711, 712, 721, 722, 723, 731 and 732 which are formed of a metal plate that is worked in a predetermined shape. The base end sides of the leaf contact pieces are formed, as shown by the leaf contact pieces 721, 722 and 723 in FIG. 8(B), in a strip shape such that their opposite sides to each other are parallel to each other in a widthwise direction and their width dimensions of the base end sides of the leaf contact pieces are equal to each other. Therefore, in this embodiment, all of the leaf contact pieces 711, 712, 721, 722, 723, 731 and 732 are held by utilizing the contact piece holding part 48 which is formed like a platform on the base plate 42 in a "V"-shape in plan view. More specifically, a plurality of holding grooves 48a is formed in the contact piece holding part 48 so as to have the same depth and the same shape and the base end sides of the leaf contact pieces 711, 712, 721, 722, 723, 731 and 732 are fitted into and fixed to the holding grooves 48a. In this embodiment, since all the depths of the plurality of holding grooves 48a are the same, the leaf contact pieces 711, 712, 721, 722, 723, 731 and 732 are held on the base plate 42 at the same height positions.

In accordance with an embodiment, the tip end parts 721c and 722c of the leaf contact pieces 721 and 722 and the tip end part 723c of the leaf contact piece 723 are abutted with the side faces of the cam parts 558 and 559 of the rotary cam body 55 whose height positions from the base plate 42 are different from each other. Therefore, in this embodiment, as described with reference to FIG. 8(B), the leaf contact piece 723 is straightly and horizontally extended from its base end side and then perpendicularly turned upward and, after that, the leaf contact piece 723 is extended horizontally again. On the other hand, the leaf contact pieces 721 and 222 are formed in a shape such that their base end portions are straightly extended at the same height position as that of the base end portion of the leaf contact piece 723 and the widths of the tip end parts 721c and 722c are enlarged upward. Therefore, even when the base end sides of the leaf contact pieces 721, 722 and 723 are held at the same height positions on the base plate 42, the tip end parts 721c, 722c and 723c of the leaf contact pieces 721, 722 and 723 can be preferably abutted with the side faces of the cam parts 558 and 559 of the rotary cam body 55 whose height positions from the base plate 42 are different from each other.

Further, in this embodiment, a circuit board 70 which is disposed to face the base plate 42 is superposed on the base end sides of the leaf contact pieces 711, 712, 721, 722, 723, 731 and 732. The circuit board 70 is a PWB (Printed Wiring Board) provided with lands to which terminal parts 711e, 712e, 721e, 722e, 723e, 731e and 732e formed upright on the base end sides of the leaf contact pieces 711, 712, 721, 722, 723, 731 and 732 are soldered. The circuit board 70 is provided with a high rigidity. In addition, the base plate 42 is covered by the outer case 43 shown in FIG. 12. The inner bottom face of the outer case 43 is formed with a rib 432 corresponding to an outer shape of the contact piece holding part 48. Therefore, in a state that the inner case 41, the base plate 42 and the outer case 43 are superposed to structure the case body 4, the base end sides of the leaf contact pieces 711, 712, 721, 722, 723, 731 and 732 are pressed in the widthwise direction, i.e., toward the base plate 42 by the circuit board 70.

In this embodiment as described above, when the leaf contact pieces 711, 712, 721, 722, 723, 731 and 732 are to be mounted on the base plate 42, the base end sides of the leaf contact pieces 711, 712, 721, 722, 723, 731 and 732 are fitted into the holding grooves 48a. As a result, the leaf contact pieces 711, 712, 721, 722, 723, 731 and 732 are mounted on the base plate 42 with a high degree of positional accuracy so as to set in a prescribed direction at a predetermined height position and thus a superior workability can be obtained. Further, it is not required to perform positional adjustment after the leaf contact pieces 711, 712, 721, 722, 723, 731 and 732 have been mounted on the base plate 42.

Further, the leaf contact pieces 711, 712, 721, 722, 723, 731 and 732 are pressed by the rib 432 of the outer case 43 through the circuit board 70. Therefore, positional displacement of the leaf contact piece from its initial position or disengagement of the leaf contact piece from the holding groove 48a does not occur. Further, the circuit board 70 is provided with a high rigidity, which is different from a case that a flexible circuit board is used. Therefore, the leaf contact pieces 711, 712, 721, 722, 723, 731 and 732 are surely fixed by the circuit board 70.

In addition, the circuit board 70 is a single-side circuit board and thus wiring patterns are not formed on its under face. Therefore, insulation to the leaf contact pieces 711, 712, 721, 722, 723, 731 and 732 can be surely secured.

In addition, in a case that the leaf contact pieces 711, 712, 721, 722, 723, 731 and 732 are directly pressed by the outer case 43, a metal outer case 43 cannot be used and, moreover, the outer case 43 is required to have a high degree of rigidity and a high degree of resistance against electricity. Therefore, material of the outer case 43 is restricted. However, according to the embodiment of the present invention, the leaf contact pieces 711, 712, 721, 722, 723, 731 and 732 are pressed through the circuit board 70 and thus restriction in material of the outer case 43 can be prevented.

In the ice making device 1 in accordance with the embodiment, cooling for making ice pieces in the ice tray 21 and heating for raking the ice pieces are performed. The cooling and heating cause the inside of the case body 4 to occur a rapid temperature change, which may cause dew formation. Further, in a refrigerator or a freezer which is provided with the ice making device 1, when a door is opened and closed, a temperature change occurs to cause dew formation. Therefore, in the ice making device 1 in accordance with an embodiment, a following dew formation countermeasure is adopted.

In other words, in the ice making device 1 in accordance with the embodiment, as shown in FIG. 3(A), the motor 5, the transmission mechanism 50, the lever drive mechanism 65, the thermostat 91 and the like are disposed in the first space 46 which is structured with the inner case 41 and the base plate 42. On the other hand, the upper half portion of the rotary cam body 55 (cam face for the leaf switches), the ice detecting switch 71, the main switch 72, the water-supply switch 73, the circuit board 70 and the like are disposed in the second space 47 which is structured with the outer case 43 and the base plate 42. Further, the base plate 42 is formed with the through hole 421. However, the rotary cam body 55 is fitted to the through hole 421 and thus a space formed with the through hole 421 is closed. The base plate 42 is formed with slits 425 but flat plate-shaped terminals 5b (power supply member) which are extended toward the outer case 43 from the upper face of the motor 5 are fitted in the slits 425. Therefore, the first space 46 and the second space 47 are substantially separated form each other by the base plate 42. Accordingly, even when the ice tray 21 (ice making unit 2) is abutted with a side face of the first space 46 (side face of the inner case 41), a rapid temperature change is not occurred in the second space 47 and thus dew formation does not occur.

A bottom plate part of the outer case 43 shown in FIG. 12 is formed with a rib 431 (second partition wall) whose height is slightly lower than that of the outer wall 435. Therefore, when the base plate 42 and the outer case 43 are superposed on each other, the inside of the second space 47 is further partitioned into two spaces (first inner small space 471 and second outer small space 472) and the first inner small space 471 is separated from a surrounding portion by the rib 431 and the outer wall 435. Further, the rib 431 includes a facing portion 431a which faces the outer wall 435 of the outer case 43 to doubly surround the first inner small space 471.

In accordance with this embodiment, the upper half portion of the rotary cam body 55, the ice detecting switch 71, the main switch 72, the water-supply switch 73, the circuit board 70 and the like are disposed in the first inner small space 471 and, on the contrary, the input lever 790 whose operation part

793 is required to be extended outside and the like are disposed in the second outer small space 472. In addition, when the ice tray 21 is abutted with the side face of the inner case 41, the ice tray 21 is located on the side of the second outer small space 472 and the first inner small space 471 is apart from the ice tray 21 (heater 26) than the second outer small space 472. Accordingly, dew formation in the first inner small space 471 in the inside of the second space 47, where the ice detecting switch 71, the main switch 72, the water-supply switch 73, the circuit board 70 and the like are disposed, can be surely prevented.

In accordance with the embodiment as described above, above-mentioned double dew formation countermeasures are provided in the first inner small space 471 where the ice detecting switch 71, the main switch 72, the water-supply switch 73 and the circuit board 70 are disposed. Therefore, even when variation of temperature occurs outside, dew is not formed in the first inner small space 471 and thus malfunction due to freezing does not occur even when an inexpensive leaf switch is used for the ice detecting switch 71, the main switch 72 and the water-supply switch 73.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A torque limiter comprising:
    a first member which is provided with a circumferential face;
    a second member comprising;
        a base plate part; and
        a cylindrical drum part which is extended from the base plate part so as to surround the circumferential face of the first member; and
    an urging member for urging the cylindrical drum part of the second member to the circumferential face of the first member;
    wherein the cylindrical drum part is formed with a plurality of cutout parts and the second member is provided with the cylindrical drum part which is divided into a plurality of elastic plate parts; and
    wherein the plurality of cutout parts is extended from a tip end of the cylindrical drum part to a middle position in a radial direction of the base plate part and the plurality of plastic plate parts is formed of the cylindrical drum part and the base plate part.

2. The torque limiter according to claim 1, wherein the urging member is a ring-shaped urging member which is mounted around the plurality of elastic plate parts.

3. The torque limiter according to claim 2, wherein a clearance is provided between the circumferential face of the first member and the elastic plate parts of the second member in a state that the ring-shaped urging member is detached from the cylindrical drum part.

4. The torque limiter according to claim 2, wherein the ring-shaped urging member is mounted on a tip end side of the elastic plate parts.

5. The torque limiter according to claim 1, wherein the cylindrical drum part is perpendicularly extended from the base plate part.

6. The torque limiter according to claim 1,
wherein the first member is a gear body which comprises;
   a large diameter circular plate part which is formed with a gear; and
   a cylindrical part which is provided with the circumferential face and which is
formed on the large diameter circular plate part;
wherein the second member is a cup-shaped sliding member in which the plurality of elastic plate parts is formed of the cylindrical drum part and the base plate part by forming the cutout parts; and
wherein the urging member is a coil spring, which urges to abut the plurality of elastic plate parts of the cylindrical drum part with the cylindrical part of the gear body by the coil spring.

7. The torque limiter according to claim 6, wherein a length of the cutout parts formed in the cylindrical drum part is longer than a length of the cutout part formed in the base plate part.

8. The torque limiter according to claim 7, wherein the coil spring is mounted on a tip end part of the cylindrical drum part.

9. The torque limiter according to claim 6, further comprising a gear for rotation transmission is formed in the base plate part of the cup-shaped sliding member.

* * * * *